US011272152B2

United States Patent
Goto et al.

(10) Patent No.: US 11,272,152 B2
(45) Date of Patent: Mar. 8, 2022

(54) ORIENTATION AND/OR POSITION ESTIMATION SYSTEM, ORIENTATION AND/OR POSITION ESTIMATION METHOD, AND ORIENTATION AND/OR POSITION ESTIMATION APPARATUS

(71) Applicant: NINTENDO CO., LTD., Kyoto (JP)

(72) Inventors: Shotaro Goto, Kyoto (JP); Hideaki Shimizu, Kyoto (JP); Hitoshi Yamazaki, Kyoto (JP); Kenji Iwata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 53 days.

(21) Appl. No.: 16/154,983

(22) Filed: Oct. 9, 2018

(65) Prior Publication Data

US 2019/0116350 A1    Apr. 18, 2019

(30) Foreign Application Priority Data

Oct. 13, 2017  (JP) .............................. JP2017-199453

(51) Int. Cl.
*H04N 13/117*  (2018.01)
*G06F 3/03*  (2006.01)
*A63F 13/5255*  (2014.01)
*G06F 3/0346*  (2013.01)
(Continued)

(52) U.S. Cl.
CPC ......... *H04N 13/117* (2018.05); *A63F 13/213* (2014.09); *A63F 13/5255* (2014.09);
(Continued)

(58) Field of Classification Search
CPC ................ H04N 13/117; H04N 13/189; A63F 12/213; A63F 13/5255; A63F 13/92; A63F 13/98;
(Continued)

(56) References Cited

U.S. PATENT DOCUMENTS 6,919,867 B2 * 7/2005 Sauer .................. H04N 13/239
                                                           345/8
10,719,950 B2   7/2020 Kawamoto
(Continued)

FOREIGN PATENT DOCUMENTS

JP   2007-064808   3/2007
JP   2013-124972   6/2013
(Continued)

OTHER PUBLICATIONS

Extended European Search Report dated Jan. 14, 2019, issued in EP 18199612.5 (9 pages).

*Primary Examiner* — Patrick N Edouard
*Assistant Examiner* — Eboni N Giles
(74) *Attorney, Agent, or Firm* — Nixon & Vanderhye, PC

(57) ABSTRACT

The orientation and/or position estimation system includes: a movable operating unit configured to be held by a user and having an image capturing section; and a stereoscopic image providing unit including a display portion configured to display a stereoscopic image, a contact portion configured to come into contact with a part of a face of a user who is viewing the stereoscopic image, and a detection subject portion configured to be captured by the image capturing section. A detection subject portion image in the image captured by the image capturing section is detected and the position and the orientation of the movable image capturing unit are estimated on the basis of the detection subject portion image. On the basis of a result of the estimation, the stereoscopic image is generated and displayed.

20 Claims, 21 Drawing Sheets

(51) Int. Cl.
*A63F 13/92* (2014.01)
*A63F 13/98* (2014.01)
*A63F 13/213* (2014.01)
*H04N 13/189* (2018.01)
*G02B 27/01* (2006.01)
*G06F 3/01* (2006.01)

(52) U.S. Cl.
CPC .............. *A63F 13/92* (2014.09); *A63F 13/98* (2014.09); *G02B 27/017* (2013.01); *G06F 3/011* (2013.01); *G06F 3/0304* (2013.01); *G06F 3/0325* (2013.01); *G06F 3/0346* (2013.01); *H04N 13/189* (2018.05)

(58) Field of Classification Search
CPC ..... G02B 27/017; G06F 3/011; G06F 3/0304; G06F 3/0325; G06F 3/0346
See application file for complete search history.

(56) References Cited

U.S. PATENT DOCUMENTS

| | | | |
|---|---|---|---|
| 2016/0232715 A1* | 8/2016 | Lee | A63F 13/211 |
| 2016/0309143 A1* | 10/2016 | Fu | H04N 13/239 |
| 2016/0371559 A1 | 12/2016 | Yang et al. | |
| 2017/0011553 A1 | 1/2017 | Chen et al. | |
| 2017/0206673 A1* | 7/2017 | Kawamoto | G06F 1/163 |
| 2018/0288400 A1 | 10/2018 | Ikenoue et al. | |
| 2019/0102647 A1 | 4/2019 | Yang et al. | |
| 2020/0326535 A1* | 10/2020 | Kim | G02B 27/0179 |

FOREIGN PATENT DOCUMENTS

| | | |
|---|---|---|
| JP | 2017-10533 A | 1/2017 |
| JP | 2017-68763 | 4/2017 |
| WO | 2016/021252 A1 | 2/2016 |

* cited by examiner

OPENING

ORIENTATION AND/OR POSITION ESTIMATION SYSTEM, ORIENTATION AND/OR POSITION ESTIMATION METHOD, AND ORIENTATION AND/OR POSITION ESTIMATION APPARATUS

CROSS REFERENCE TO RELATED APPLICATION

The disclosure of Japanese Patent Application No. 2017-199453, filed on Oct. 13, 2017, is incorporated herein by reference.

FIELD

The exemplary embodiments relate to technology for estimating an orientation and a position, and more specifically, relate to technology for estimating a position and an orientation of an operation device held by a user, or the like, on the basis of an image obtained by an image capturing device capturing a detection subject portion placed in a real space.

BACKGROUND AND SUMMARY

Conventionally, there is known marker identification technology for detecting and identifying an indication (marker) located in a real space or on a real object from an image captured by an image capturing device. In this technology, for example, a marker provided to a real object moving in a space is captured by a camera, and the position of a projected image of the marker on the image is detected, whereby the position and the orientation of the real object in the space are measured. In addition, a plurality of markers placed in the real space are captured, whereby the position and the orientation of the capturing camera in the space are measured. Such technology is used also in a virtual reality (VR) field.

The above technology requires the plurality of cameras to be provided in a fixed manner in order to capture the markers (for example, the cameras are provided at such positions as to include the user and the markers entirely in the image capturing range), and thus great time and effort are taken for the arrangement thereof and the like.

Therefore, an object of the exemplary embodiments is to provide an orientation and/or position estimation system having a simpler configuration.

Configuration examples for achieving the above object will be shown below.

One configuration example is an orientation and/or position estimation system including a movable image capturing unit, a stereoscopic image providing unit, a detection section, a specifying section, an estimation section, and an image generation section. The movable image capturing unit has an image capturing section configured to capture a surrounding area. The stereoscopic image providing unit includes at least one display portion configured to display a stereoscopic image composed of a left-eye image and a right-eye image having parallax therebetween, a contact portion configured to come into contact with a part of a face of the user who is viewing the stereoscopic image, and a detection subject portion configured to be captured by the image capturing section of the movable image capturing unit that is being held by the user. The detection section is configured to detect a detection subject portion image indicating the detection subject portion and included in an image captured by the image capturing section. The specifying section is configured to specify a position and/or a shape, in the captured image, of the detection subject portion image detected by the detection section. The estimation section is configured to estimate an orientation and/or a position of the movable image capturing unit on the basis of the position and/or the shape, specified by the specifying section, of the detection subject portion image in the captured image. The image generation section is configured to generate the stereoscopic image to be displayed on the at least one display portion, on the basis of a result of the estimation by the estimation section.

According to the above configuration example, it is possible to provide an orientation and/or position estimation system having a simplified configuration by a user holding the movable image capturing unit.

In another configuration example, the movable image capturing unit may further include: an operating portion; and an operation data generation section configured to generate predetermined data on the basis of operation on the operating portion by the user, and the image generation section may further generate the stereoscopic image to be displayed on the at least one display portion, on the basis of a result of the estimation by the estimation section and the data generated by the operation data generation section.

According to the above configuration example, it becomes possible to perform more various operations as an operation using the movable image capturing unit.

In another configuration example, the movable image capturing unit may further include a light-emitting section configured to emit predetermined light at least in substantially the same direction as an image capturing direction of the image capturing section, and the detection subject portion may be made of a retroreflective material that reflects the predetermined light from the light-emitting section.

According to the above configuration example, it is possible to detect the detection subject portion more reliably.

In another configuration example, the detection subject portion may be provided on a predetermined surface of the stereoscopic image providing unit that faces in substantially the same direction as a line-of-sight direction of the user who is viewing the at least one display portion in a state in which a part of the face of the user is in contact with the contact portion, and/or at such a position on the stereoscopic image providing unit that allows the detection subject portion to be viewed as seen from a direction opposite to the line-of-sight direction.

According to the above configuration example, it is possible to enhance estimation accuracy for the position and the orientation of the movable image capturing unit.

In another configuration example, the stereoscopic image providing unit may have a plurality of the detection subject portions having predetermined areas, and the plurality of detection subject portions may include three detection subject portions that are not arranged on an identical straight line.

According to the above configuration example, it is possible to enhance estimation accuracy for the position and the orientation of the movable image capturing unit.

In another configuration example, of the plurality of detection subject portions, at least three or more detection subject portions may be arranged so as to be asymmetric between a right side and a left side and/or asymmetric between an upper side and a lower side, when the predetermined surface of the stereoscopic image providing unit is seen from a front side.

According to the above configuration example, it is possible to enhance estimation accuracy for the position and the orientation of the movable image capturing unit.

In another configuration example, with the plurality of detection subject portions defined as end points, the plurality of detection subject portions may be arranged so as to be asymmetric between the right side and the left side and/or asymmetric between the upper side and the lower side, with respect to a line passing a center point which is a start position from which linear distances to the end points are substantially equal to each other.

According to the above configuration example, it is possible to enhance estimation accuracy for the position and the orientation of the movable image capturing unit.

In another configuration example, the movable image capturing unit may further include an acceleration sensor and/or an angular velocity sensor, and the estimation section may further estimate the orientation and/or the position of the movable image capturing unit on the basis of a result of the detection by the acceleration sensor and/or the angular velocity sensor.

According to the above configuration example, it is possible to expand the range in which the position and the orientation of the movable image capturing unit can be estimated.

In another configuration example, when the detection subject portion image cannot be determined or specified in the image captured by the movable image capturing unit, the estimation section may estimate the orientation and/or the position of the movable image capturing unit on the basis of a result of the detection by the acceleration sensor and/or the angular velocity sensor.

According to the above configuration example, it is possible to expand the range in which the position and the orientation of the movable image capturing unit can be estimated.

In another configuration example, the orientation and/or position estimation system may further include a connection portion having one end connected to at least a part of the movable image capturing unit and the other end connected to a part of the stereoscopic image providing unit.

According to the above configuration example, the range in which the movable image capturing unit can be moved is limited by the connection portion, and thus estimation accuracy for the orientation and the position can be enhanced.

In another configuration example, a position at which the connection portion and the stereoscopic image providing unit are connected may be a position that is near a lower side of the surface on which the detection subject portion is provided and that is on or near a line vertically extending through substantially a center of the surface on which the detection subject portion is provided as seen from a front side.

According to the above configuration example, an image of the detection subject portion can be captured more reliably and thus estimation accuracy for the orientation and the position can be enhanced.

In another configuration example, the connection portion may have a first movable portion provided near a position at which the connection portion and the stereoscopic image providing unit are connected. A relative positional relationship and/or a relative orientation relationship between the stereoscopic image providing unit and the movable image capturing unit may be changeable by the first movable portion.

According to the above configuration example, the movable range of the movable image capturing unit can be further expanded.

In another configuration example, the connection portion may have a second movable portion provided at a predetermined position different from a position at which the connection portion and the stereoscopic image providing unit are connected, and different from a position at which the connection portion and the movable image capturing unit are connected. A relative positional relationship and/or a relative orientation relationship between the stereoscopic image providing unit and the movable image capturing unit may be changeable by the second movable portion.

According to the above configuration example, the movable range of the movable image capturing unit can be further expanded.

In another configuration example, the connection portion may have a third movable portion provided near a position at which the connection portion and the movable image capturing unit are connected. A relative positional relationship and/or a relative orientation relationship between the stereoscopic image providing unit and the movable image capturing unit may be changeable by the third movable portion.

According to the above configuration example, the movable range of the movable image capturing unit can be further expanded.

In another configuration example, the connection portion may be extendable and contractible.

According to the above configuration example, owing to the extendable/contractible structure, the user's convenience in storage and the like can be enhanced.

In another configuration example, the image capturing section and the operating portion may be provided to a housing attachable to and detachable from the movable image capturing unit.

According to the above configuration example, the housing having the image capturing section and the operating portion can be used as, for example, a single controller, by being held after detached from the movable image capturing unit.

The exemplary embodiments can provide an orientation and/or position estimation system having a simpler configuration.

BRIEF DESCRIPTION OF THE DRAWINGS

FIG. 11 is a schematic view showing a non-limiting example in which the VR game kit 2 is separated;

DETAILED DESCRIPTION OF NON-LIMITING EXAMPLE EMBODIMENTS

Hereinafter, an exemplary embodiment will be described. It is to be understood that as used herein, elements and the like written in a singular form with a word "a" or "an" attached before them do not exclude those in a plural form.

[1. Entire Configuration of Game System]

Figure 1:
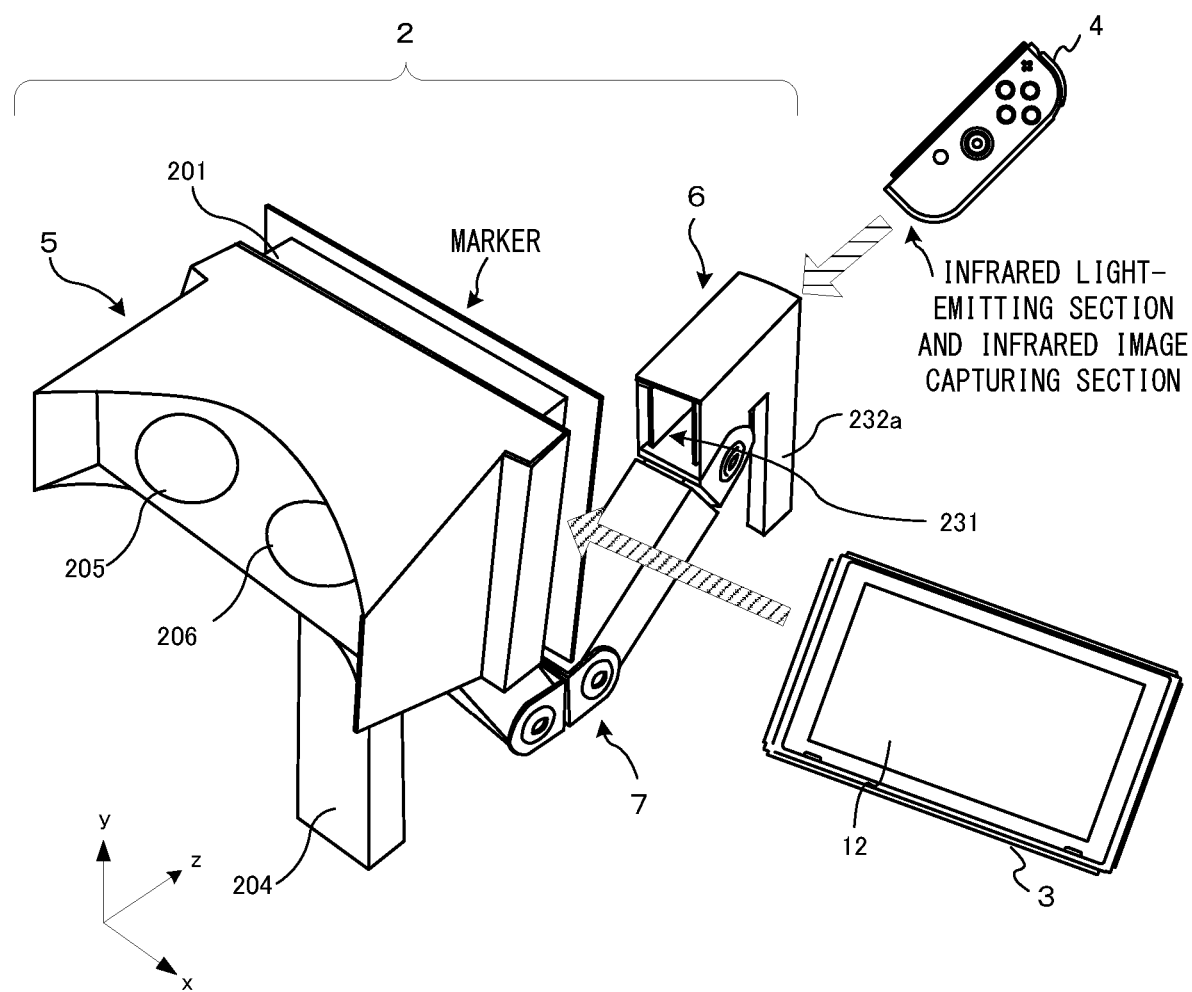
FIG. 1 is a schematic view showing a non-limiting example of the entirety of a game system according to one of the exemplary embodiments.

Hereinafter, with reference to the drawings, a position orientation estimation system according to an exemplary embodiment of the present invention will be described. In the exemplary embodiment, a game system will be described as an example of the position orientation estimation system. FIG. 1 is a schematic view showing the entirety of a game system 1. In FIG. 1, the game system 1 includes a virtual reality (VR) game kit 2, a game device body 3 as an example of an information processing device, and a controller 4. The VR game kit 2 includes a VR goggle portion 5, a holding operating portion 6, and a connection arm portion 7 connecting these portions. The connection arm portion 7 has one or a plurality of joint parts, and the connection arm portion can be folded at the joint parts. Thus, the connection arm portion 7 is configured to be extendable and contractible to a certain extent as a whole. The VR goggle portion 5 has a game device mounting portion 201 to which the game device body 3 can be inserted and fixed. Also, the holding operating portion 6 has a controller mounting portion 231 to which the controller 4 can be inserted and fixed. Further, the VR goggle portion 5 is configured so as to allow a user to see a display 12 of the game device body 3 inserted into the game device mounting portion 201, via two lenses (right-eye lens 206 and left-eye lens 205) provided to the VR goggle portion 5 (the VR goggle portion 5 functions as so-called VR goggles). Both of the VR goggle portion 5 and the holding operating portion 6 have holding portions (204 and 232a, and 232b described later) that a user can hold by one or both hands. The holding portions may have substantially rod-like shapes or grip shapes, as an example.

The game device body 3 has, as an example, a substantially plate-like housing, and a display is provided on a main surface thereof. The main surface roughly has a rectangular shape. The controller 4 is wirelessly connected with the game device body 3. Information indicating operations on the controller 4 is transmitted to the game device body via wireless communication. As described later in detail, the controller 4 has an infrared light-emitting section and an infrared image capturing section at the lower surface thereof. The VR goggle portion 5 has, on a surface (marker arrangement portion 202 described later) on the holding operating portion 6 side, a plurality of markers each of which is, at least partially, made of a retroreflective material, as an example of a detection subject portion (detection target).

In the exemplary embodiment, the game device body 3 is inserted and mounted to the game device mounting portion 201 such that the display 12 side of the game device body 3 faces the lens side. In addition, the controller 4 is inserted and mounted to the controller mounting portion 231 such that the lower surface (surface where the infrared light-emitting section and the infrared image capturing section are present) of the controller 4 faces the VR goggle portion 5. With the game device body 3 and the controller 4 mounted to the VR game kit 2 as described above, a game process in the game system 1 according to the exemplary embodiment is executed.

This configuration can be also expressed as follows. That is, a structure obtained by mounting the game device body 3 to the VR goggle portion 5 is defined as a first part, and a structure obtained by mounting the controller 4 to the holding operating portion 6 is defined as a second part. The first part has the markers and a function for providing a stereoscopic image (VR space image) described later to a user, and the second part has an image capturing function capable of capturing an image of the markers. Then, the configuration can be also expressed as a configuration in which the first part and the second part are connected via the connection arm portion 7. It is noted that the first part can be also said as an example of a stereoscopic image providing unit composed of the VR goggle portion 5 and the game device body 3, and the second part can be also said as an example of a movable image capturing unit composed of the controller 4 and the holding operating portion 6.

Figure 2:
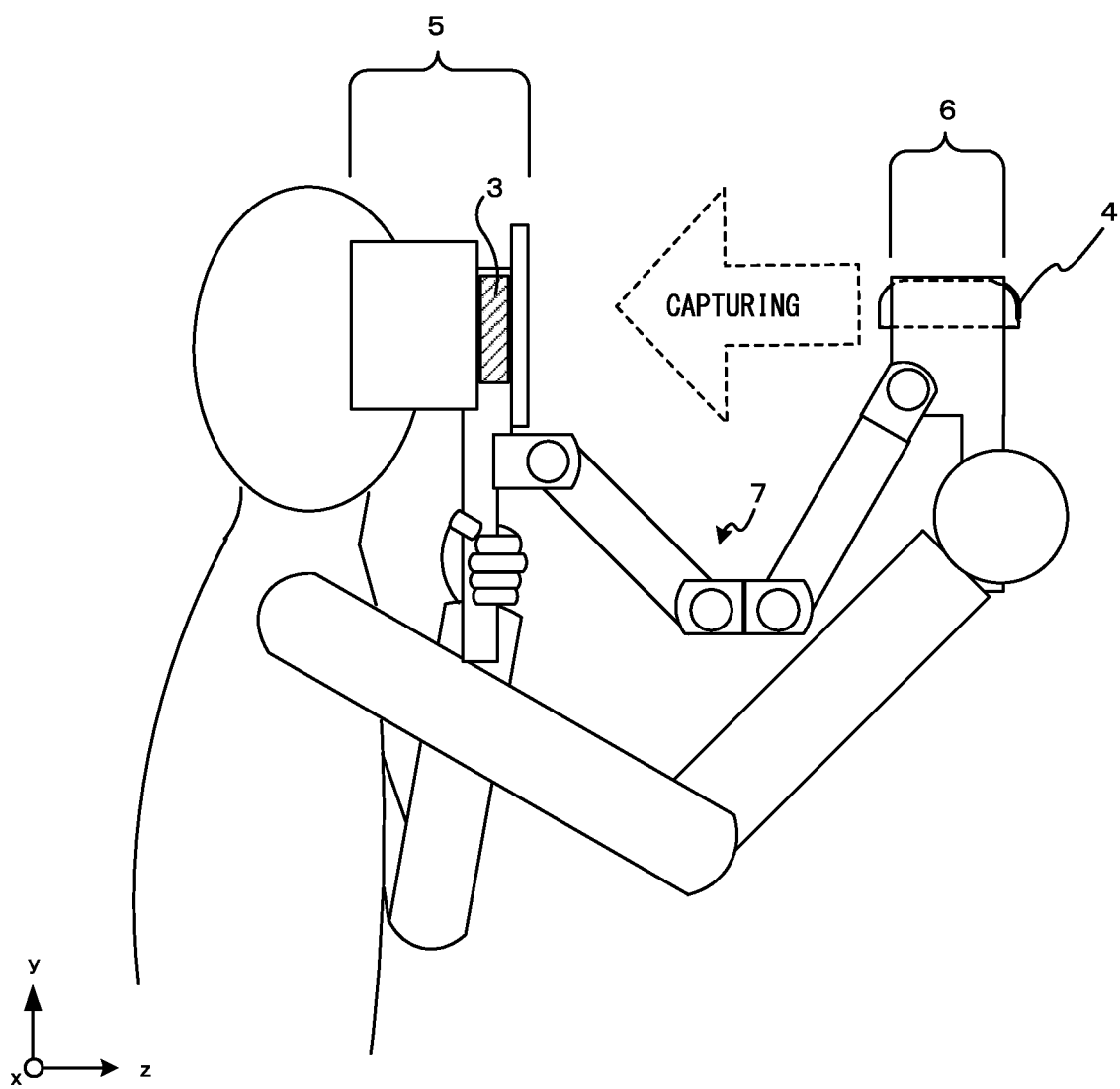
FIG. 2 is a schematic view showing a non-limiting example in which a user is playing (executing a game process) using a game system 1.

FIG. 2 is a schematic view showing a user playing (executing a game process) using the game system 1. In the example in FIG. 2, the user holds the VR goggle portion 5 by the left hand and holds the holding operating portion 6 by the right hand. The user is in a posture of peeking with the positions of the lenses of the VR goggle portion 5 aligned with the positions of the user's eyes. In other words, the user is in such a posture that a part of the user's face is in contact with a substantially arc-shaped part of the VR goggle portion 5. Then, the user plays a game by changing the position of the holding operating portion 6, basically without moving the position of the VR goggle portion 5.

Figure 3:
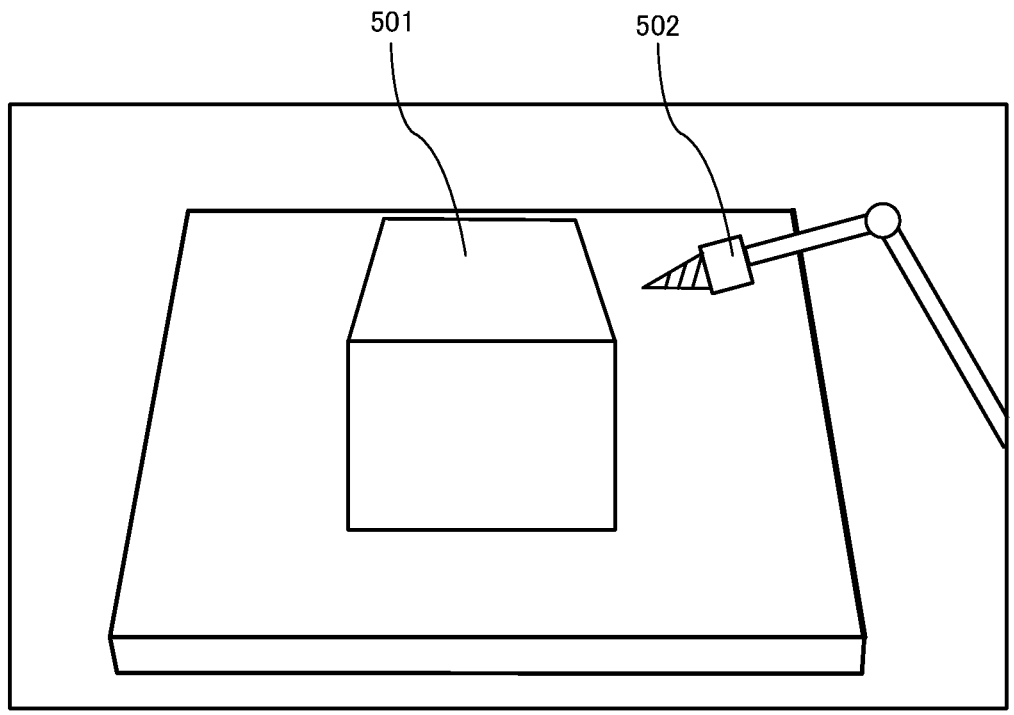
FIG. 3 is a non-limiting example of a screen in the game process according to one of the exemplary embodiments.

FIG. 3 shows a non-limiting example of a screen in a game process according to the exemplary embodiment. This game is a game using sculpture as a subject. Specifically, this game is a sculpture game of chipping a block object 501 existing in a virtual space by a drill object 502, to deform the same. The user can move the position of the drill object 502 in the virtual space by moving the right arm holding the holding operating portion 6 (in the real space) to change the position of the holding operating portion 6. Although described later in detail, a holding portion, of the holding operating portion 6, that is held by the right hand is configured to allow a predetermined button of the controller 4 to be pressed by the user squeezing the holding portion by the right hand. It is possible to rotate a drill part of the drill object 502 by pressing the button. That is, in a state in which the drill part of the drill object 502 is in contact with the block object 501, by rotating the tip end portion through the above operation, the user can chip the block object 501.

Moving operation for the drill object 502 is achieved by the following process. In the above state as shown in FIG. 2, infrared light is emitted toward the VR goggle portion 5 side (user side) from the controller 4 (infrared light-emitting section) mounted to the holding operating portion 6. The infrared image capturing section of the controller 4 performs an image capturing process with the image capturing direction set toward the side where the VR goggle portion 5 is present (the emitting direction of infrared light). The captured image includes infrared light (hereinafter, reflected light) reflected by the markers (retroreflective material) provided on the VR goggle portion 5 side. The positions of the markers (reflected light) in the captured image are calculated (detected) through an analysis process on the captured image, and the relative orientation of the controller 4 with respect to the markers is calculated on the basis of the above positions. Then, the position of the drill object 502 is changed in accordance with the calculated orientation of the controller 4.

In the exemplary embodiment, the game screen is displayed as a stereoscopic image (VR space image, VR video). Therefore, in an exact sense, a right-eye image and a left-eye image having parallax therebetween are displayed on the display 12. The relationship between the position of the right-eye lens of the VR goggle portion 5 and the display position of the right-eye image on the display 12 is set such that the right-eye image is viewed by the right eye of the user through the right-eye lens of the VR goggle portion 5. In the same manner, the relationship between the position of the left-eye lens and the display position of the left-eye image on the display 12 is also set such that the left-eye image is viewed by the left eye of the user through the left-eye lens of the VR goggle portion 5. By causing the right eye and the left eye of the user to respectively view the right-eye image and the left-eye image (i.e., by causing the user to view the right-eye image and the left-eye image having parallax therebetween), it is possible to display a stereoscopic image with a stereoscopic effect to the user. The game screen example shown in FIG. 3 is an example of a stereoscopic image viewed by the user through the lenses of the VR goggle portion 5.

Next, elements composing the game system 1 will be described.

[Hardware Configuration of Game Device Body 3]

Figure 4:
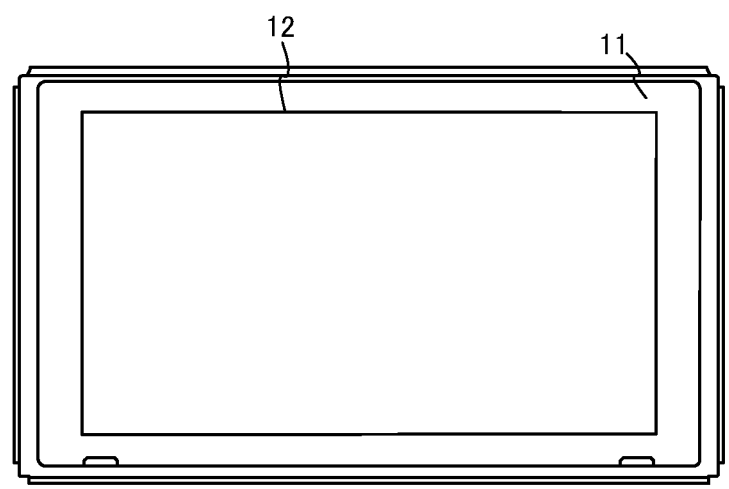
FIG. 4 is an external view showing a non-limiting example of a game device body 3.

First, the game device body 3 will be described. FIG. 4 is an external view of the game device body 3. As described above, the game device body 3 has the substantially plate-like housing 11. The game device body 3 has the display 12 provided on the main surface (surface on the front side) of the housing 11. The display 12 displays an image generated by the game device body 3. In the exemplary embodiment, the display 12 is a liquid crystal display device (LCD). However, the display 12 may be any type of display device.

Although not shown, a slot is provided on the upper side surface of the housing 11. The slot is so shaped as to allow a predetermined type of storage medium to be attached to the slot. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the game device body 3 and/or a program (e.g., a program for an application or the like) executed by the game device body 3.

The housing 11 has a power button on the upper side surface. The housing 11 has a speaker therein.

Figure 5:
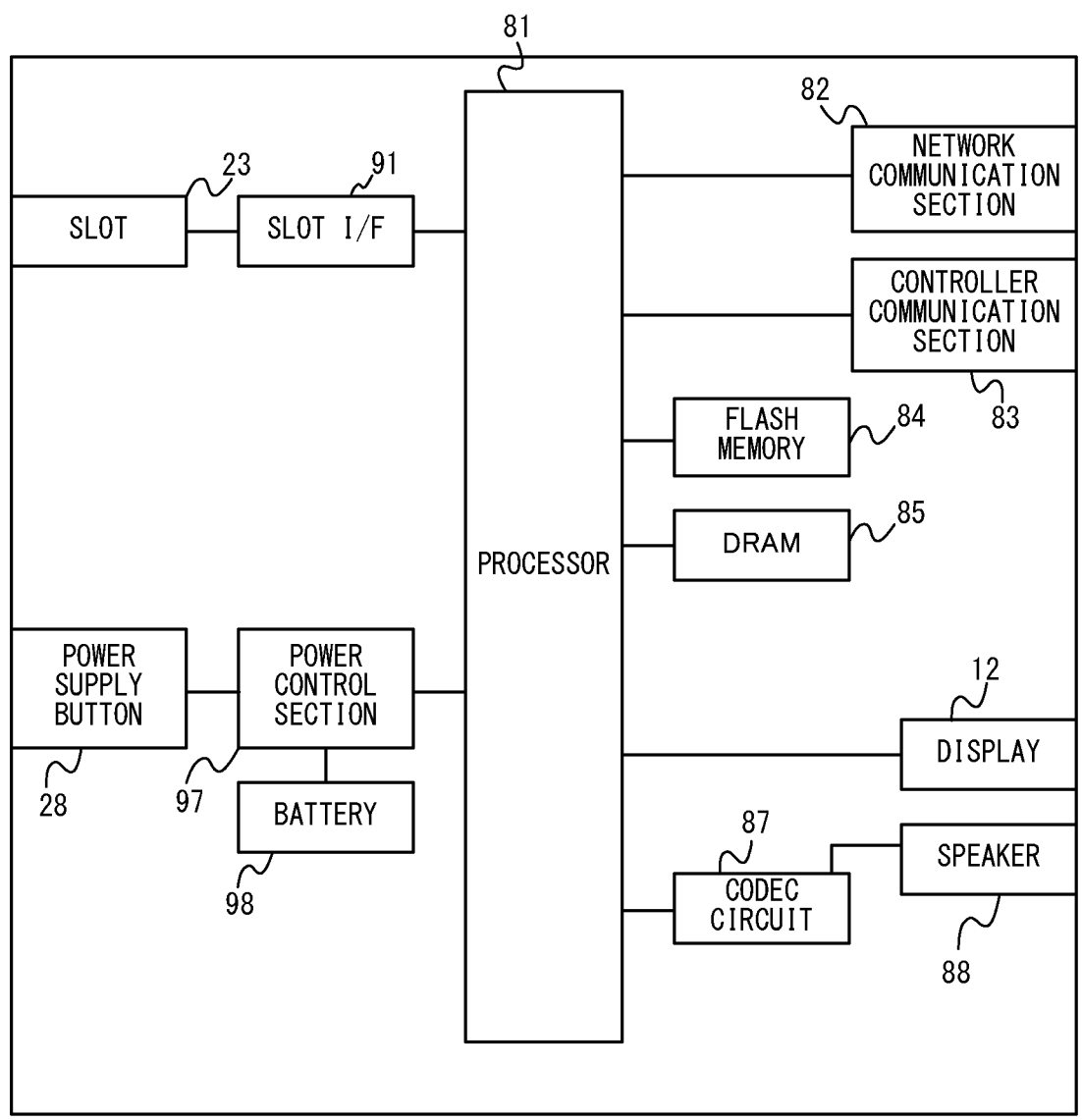
FIG. 5 is a block diagram showing a non-limiting example of the internal configuration of the game device body 3.

FIG. 5 is a block diagram showing an example of the internal configuration of the game device body 3. In FIG. 5, the game device body 3 includes one or a plurality of processors 81. The processor 81 is an information processing section for executing various types of information processing to be executed by the game device body 3. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The game device body 3 includes a flash memory 84 and a DRAM (Dynamic Random Access Memory) 85 as examples of internal storage media built into the game device body 3. The flash memory 84 and the DRAM 85 are connected to the processor 81. The flash memory 84 is a memory mainly used to store various data (or programs) to be saved in the game device body 3. The DRAM 85 is a memory used to temporarily store various data used for information processing.

The game device body 3 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The game device body 3 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another game device body 3 of the same type, using a predetermined communication method (e.g., communication based on a unique protocol or infrared light communication). It should be noted that the wireless communication in the above second communication form achieves the function of enabling so-called "local communication" in which the game device body 3 can wirelessly communicate with another game device body 3 placed in a closed local network area, and the plurality of game device bodies 3 directly communicate with each other to transmit and receive data.

The game device body 3 includes a controller communication section 83. The controller communication section 83 is connected to the processor 81. The controller communication section 83 performs wireless communication with the controller 4. The communication method between the game device body 3 and the controller 4 is optional. In the exemplary embodiment, the controller communication section 83 performs communication compliant with the Bluetooth (registered trademark) with the controller 4.

Further, the display 12 is connected to the processor 81. The processor 81 displays a generated image (e.g., an image generated by executing the above information processing) and/or an externally acquired image on the display 12.

The game device body 3 includes a codec circuit 87 and speakers (specifically, a left speaker and a right speaker) 88. The codec circuit 87 is connected to the speakers 88 and also connected to the processor 81. The codec circuit 87 is a circuit for controlling the input and output of sound data to and from the speakers 88.

The game device body 3 includes a power control section 97 and a battery 98. The power control section 97 is connected to the battery 98 and the processor 81. Based on a command from the processor 81, the power control section 97 controls the supply of power from the battery 98 to the above components.

[Hardware Configuration of Controller 4]

Figure 6:
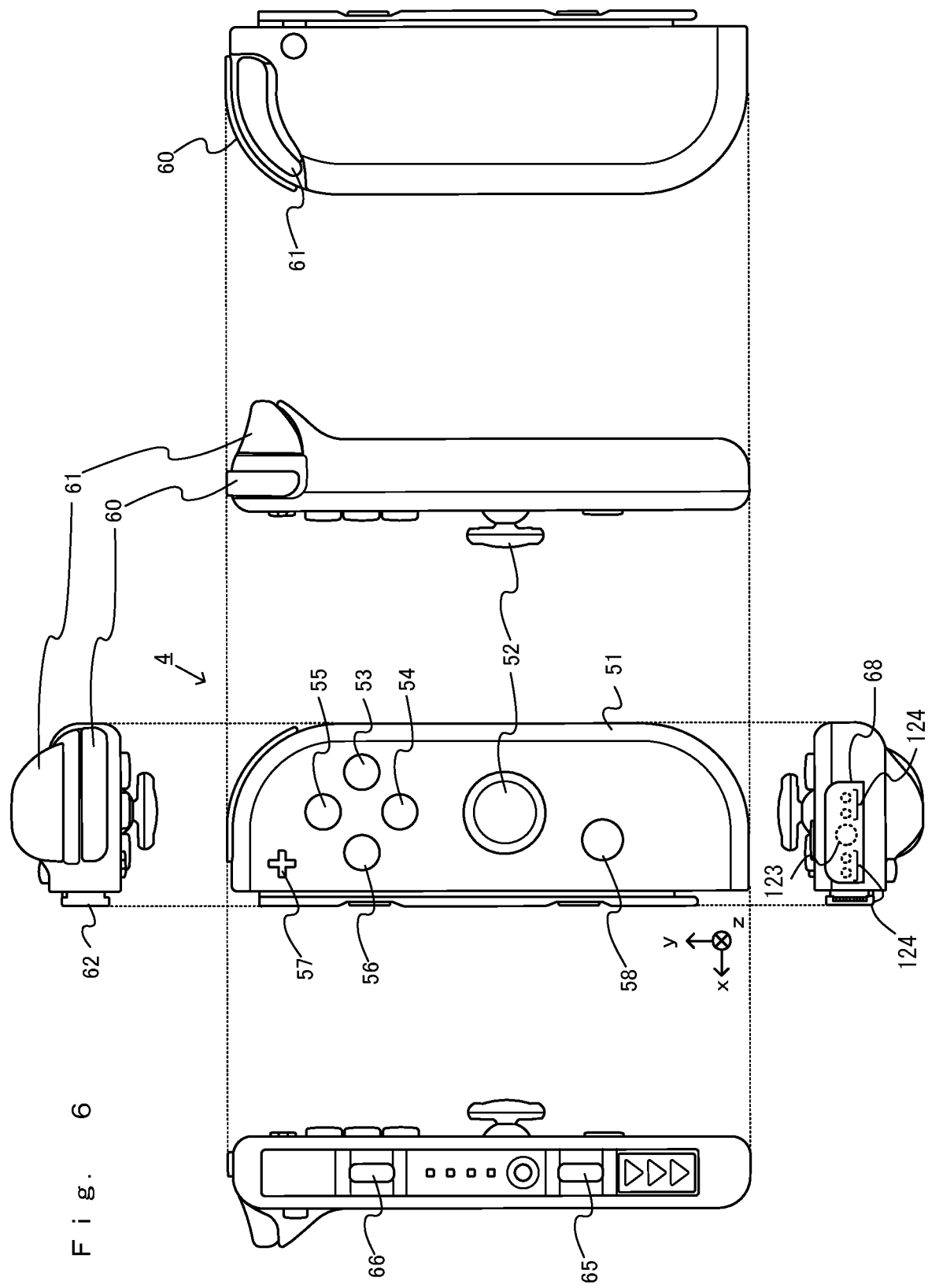
FIG. 6 is six orthogonal views showing a non-limiting example of a controller 4.

Next, the controller 4 will be described. FIG. 6 is six orthogonal views showing an example of the controller 4. As shown in FIG. 6, the controller 4 includes a housing 51. In the exemplary embodiment, the housing 51 has a vertically long shape, i.e., is shaped to be long in an up-down direction. The controller 4 can also be held in the orientation in which the controller 4 is vertically long. The housing 51 has such a shape and a size that when held in the orientation in which the housing 51 is vertically long, the housing 51 can be held with one hand, particularly the right hand. Further, the controller 4 can also be held by both hands in the orientation in which the controller 4 is horizontally long.

The controller 4 has an analog stick 52 as a direction input section. The controller 4 has four operation buttons 53 to 56 (specifically, A button 53, B button 54, X button 55, and Y button 56) on a main surface of the housing 51. The controller 4 has a + (plus) button 57 and a home button 58. The controller 4 has a first R button 60 and a ZR button 61 at an upper right part of the side surface of the housing 51. The controller 4 has a second L button 65 and a second R button 66. The above various types of buttons and the analog stick 52 output information about operations performed thereon, to a communication control section 101 repeatedly at appropriate timings.

Further, a window portion 68 is provided on a lower side surface of the housing 51. Although the details will be described later, the controller 4 includes an infrared image capturing section 123 and an infrared light-emitting section 124, which are placed within the housing 51. The infrared image capturing section 123 captures a portion around the controller 4 through the window portion 68 such that a down direction of the controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

In another exemplary embodiment, the infrared light-emitting section 124 may not necessarily be provided. In this case, for example, the markers may be configured to emit infrared light.

Figure 7:
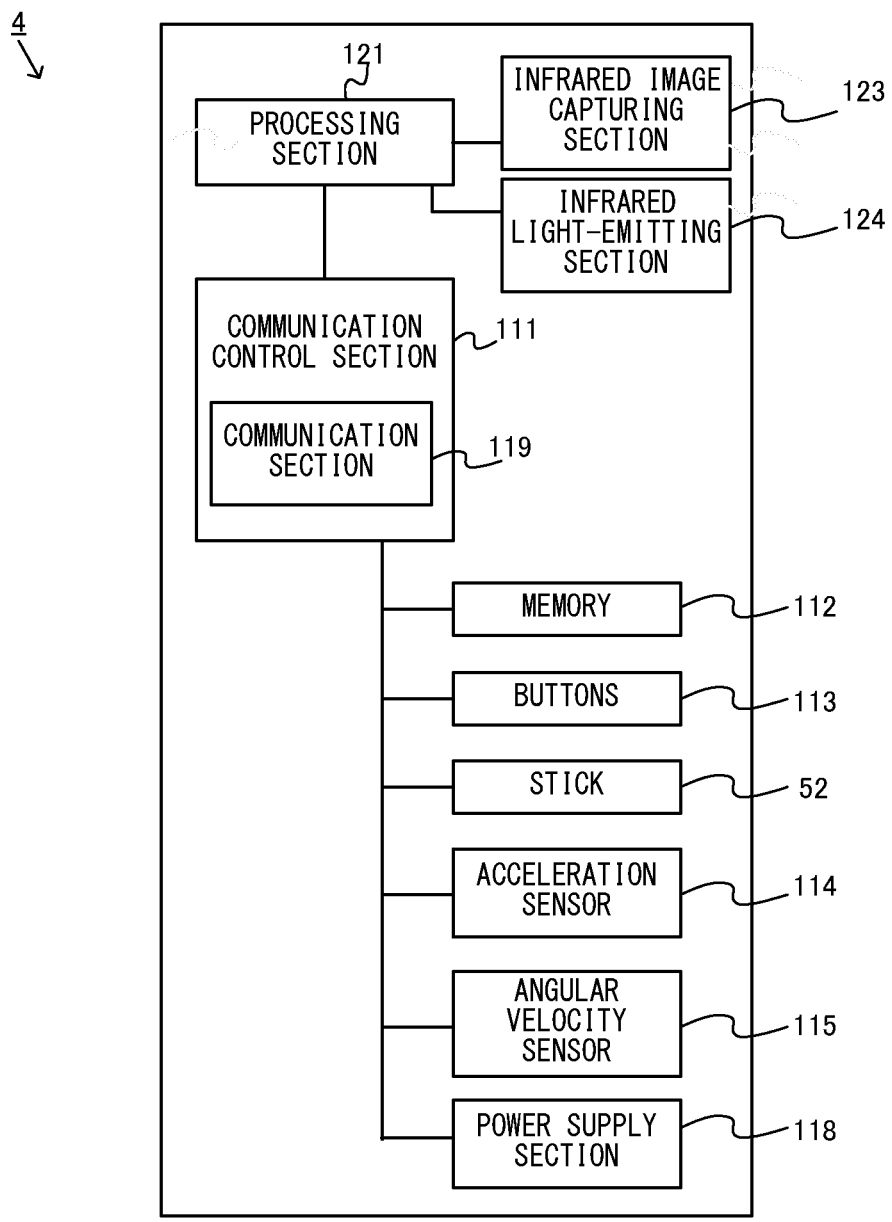
FIG. 7 is a block diagram showing a non-limiting example of the internal configuration of the controller 4.

FIG. 7 is a block diagram showing the internal configuration of the controller 4. As shown in FIG. 7, the controller 4 includes a communication control section 111 for performing communication with the game device body 3. A communication section 119 is included in the communication control section 111. The communication control section 111 is connected to various constituent elements. Further, the controller 4 includes a memory 112 such as a flash memory. The communication control section 111 includes, for example, a microcomputer (or a microprocessor) and executes firmware stored in the memory 112, thereby performing various processes.

The communication control section 111 is capable of performing communication with the game device body 3 via wireless communication. That is, the communication control section 111 performs wireless communication with the game device body 3 (specifically, controller communication section 83), using the communication section 119. The wireless communication between the controller communication section 83 and the communication control section 111 (communication section 119) is performed in accordance with the Bluetooth (registered trademark) standard, for example.

The controller 4 has the buttons 113 and the analog stick 52. The buttons 113 and the analog stick 52 output information about operations performed thereon, to the communication control section 111 repeatedly at appropriate timings.

The controller 4 has an inertial sensor. Specifically, the controller 3 has an acceleration sensor 114 and/or an angular velocity sensor 115. In the exemplary embodiment, the acceleration sensor 114 detects the magnitudes of accelerations along predetermined three axial (e.g., xyz axes shown in FIG. 6) directions. It should be noted that the acceleration sensor 114 may detect an acceleration along one axial direction or accelerations along two axial directions. In the exemplary embodiment, the angular velocity sensor 115 detects angular velocities about predetermined three axes (e.g., the xyz axes shown in FIG. 6). It should be noted that the angular velocity sensor 115 may detect an angular velocity about one axis or angular velocities about two axes. Each of the acceleration sensor 114 and the angular velocity sensor 115 is connected to the communication control section 111. Then, the detection results of the acceleration sensor 114 and the angular velocity sensor 115 are outputted to the communication control section 111 repeatedly at appropriate timings.

The communication control section 111 acquires information regarding an input (specifically, information regarding an operation or the detection result of the sensor) from each of input sections (specifically, the buttons 113, the analog stick 52, and the sensors 114 and 115). The communication control section 111 transmits operation data including the acquired information (or information obtained by performing predetermined processing on the acquired information) to the game device body 3. It should be noted that the operation data is transmitted repeatedly, once every predetermined time. It should be noted that the interval at which the information regarding an input is transmitted from each of the input sections to the game device body 3 may be or may not be the same.

The above operation data is transmitted to the game device body 3, whereby the game device body 3 can obtain inputs provided to the controller 4. That is, the game device body 3 can determine operations on the buttons 113 and the analog stick 52 on the basis of the operation data. Further, the game device body 3 can calculate information regarding the motion and/or the orientation of the controller 4 on the basis of the operation data (specifically, the detection results of the acceleration sensor 114 and the angular velocity sensor 115).

In another exemplary embodiment, information regarding the motion and/or the orientation of the controller 4 may be calculated on the basis of only one of the acceleration sensor and the angular velocity sensor.

Further, the controller 4 includes the infrared image capturing section 123. The infrared image capturing section 123 includes an infrared camera for capturing a portion around the controller 4. As an example, the game device body 3 and/or the controller 4 calculate information of a captured image (e.g., information related to the luminance of a plurality of blocks into which at least the entirety of a partial area of a captured image is divided or the like), and on the basis of the calculated information, determine a change in the portion around the controller 4. Further, the infrared image capturing section 123 may capture an image using only ambient light, but in the exemplary embodiment, includes the infrared light-emitting section 124, which emits infrared light. The infrared light-emitting section 124 emits infrared light, for example, in synchronization with the timing when the infrared camera captures an image. As for the light emission direction, the infrared light is emitted at least in substantially the same direction as the image capturing direction of the infrared camera. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the controller 4, or may be provided as a single device in the same package in the controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera. In another exemplary embodiment, without providing the infrared light-emitting section 124, a configuration in which image capturing is performed by only the infrared image capturing section 123 and a visible light camera as a visible light image capturing section, may be employed.

The controller 4 includes a processing section 121. The processing section 121 is connected to the communication control section 111. Further, the processing section 121 is connected to the infrared image capturing section 123 and the infrared light-emitting section 124. The processing section 121 includes a CPU, a memory, and the like. On the basis of a predetermined program (e.g., an application program for performing image processing and various calculations) stored in a storage device (e.g., a non-volatile memory or the like) (not shown) included in the controller 4, and in accordance with a command from the game device body 3, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the game device body 3 via the communication control section 111. Further, in accordance with a command from the game device body 3, the processing section 121 performs the process of managing the infrared light-emitting section 124. For example, in accordance with a command from the game device body 3, the processing section 121 controls the light emission of the infrared light-emitting section 124. It should be noted that a memory used by the processing section 121 to perform processing may be provided in the processing section 121 or may be the memory 112.

The controller 4 includes a power supply section 118. In the exemplary embodiment, the power supply section 118 includes a battery and a power control circuit. Although not shown in the drawing, the power control circuit is connected to the battery and also connected to components of the controller 4 (specifically, components that receive power supplied from the battery).

[VR Game Kit]

Figure 8:
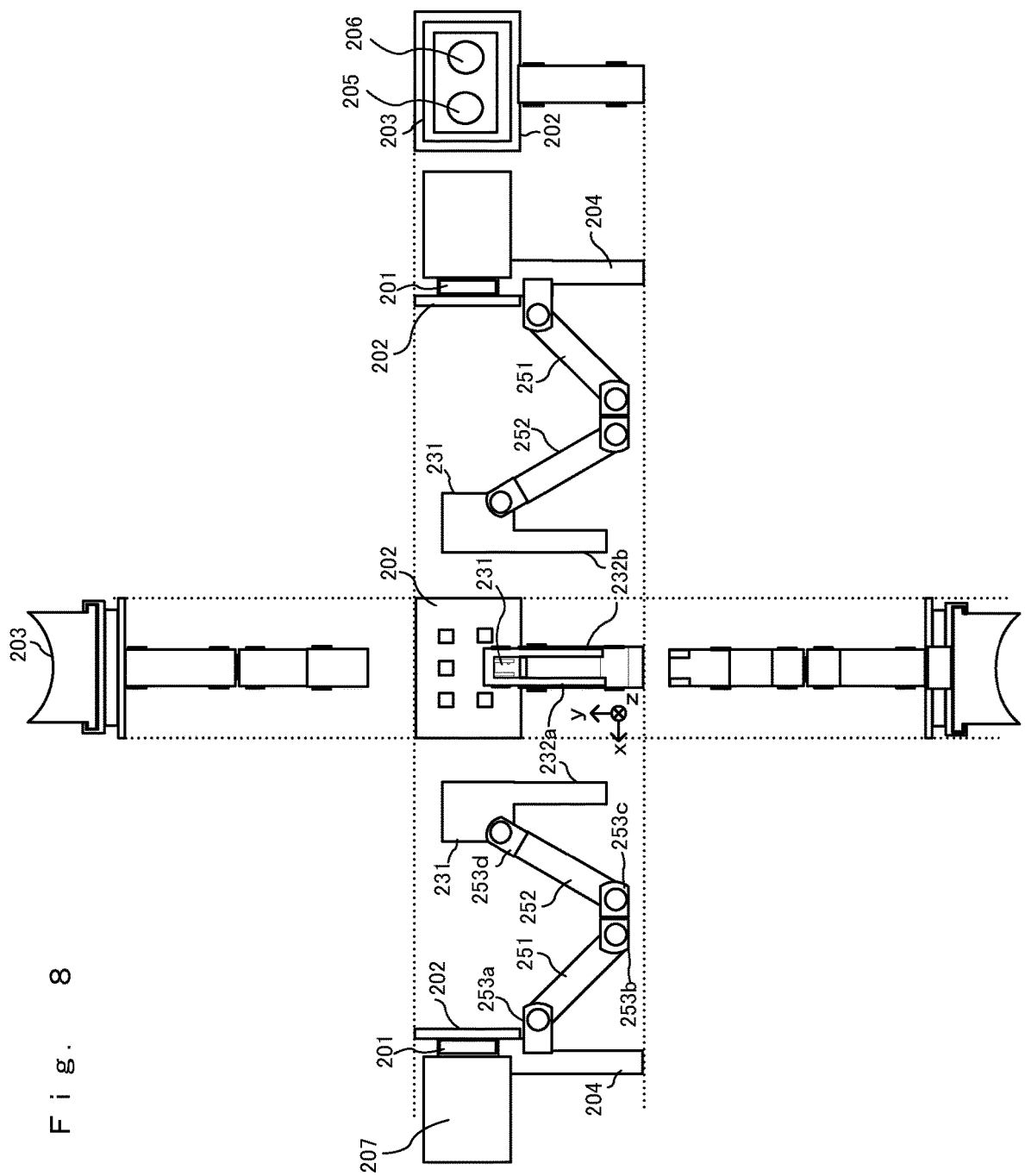
FIG. 8 is six orthogonal views showing a non-limiting example of a VR game kit 2.
Figure 9:
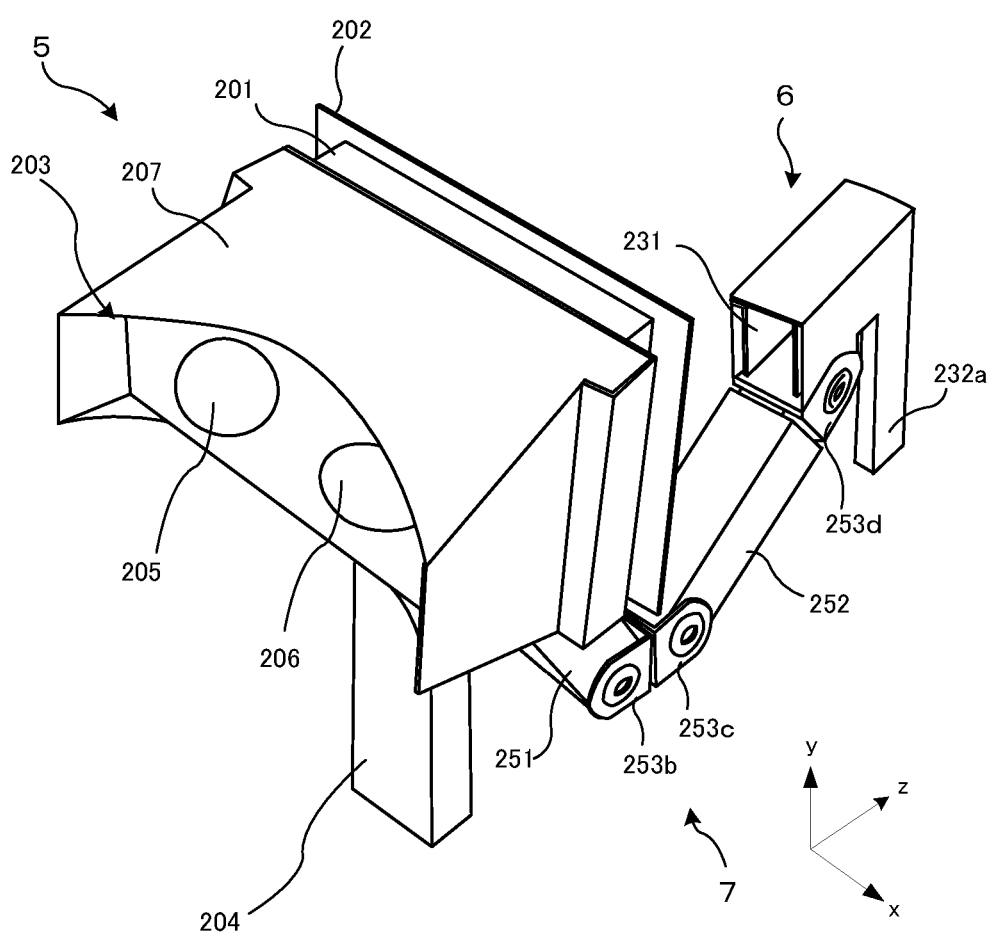
FIG. 9 is a perspective view showing a non-limiting example of the VR game kit 2.
Figure 10:
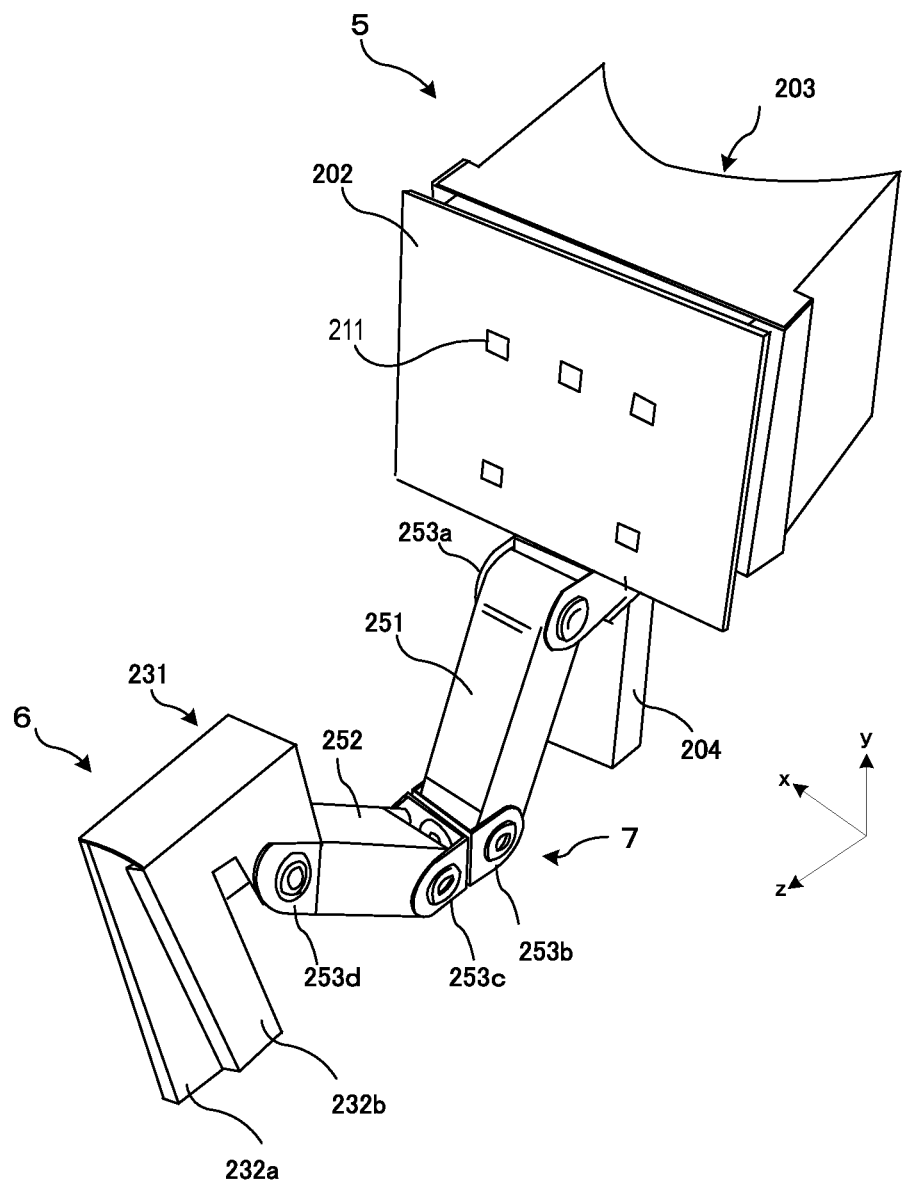
FIG. 10 is a perspective view showing a non-limiting example of the VR game kit 2.
Figure 1:
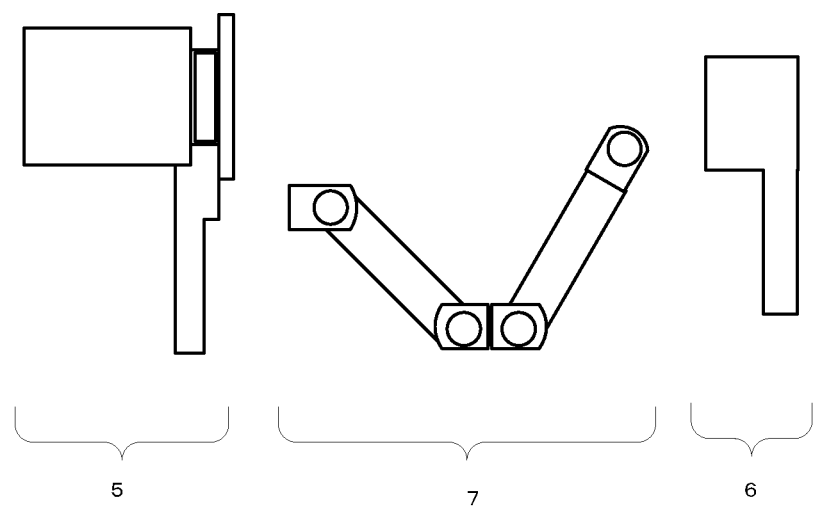

Next, the VR game kit 2 will be described. FIG. 8 is six orthogonal views showing an example of the VR game kit 2. FIG. 9 is a perspective view of the VR game kit 2 as seen from the VR goggle portion 5 side. FIG. 10 is a perspective view of the VR game kit 2 as seen from the holding operating portion 6 side. For the purpose of facilitating the understanding of the configuration of each part, FIG. 11 shows a schematic view of the VR goggle portion 5, the connection arm portion 7, and the holding operating portion 6 that are separated from each other.

The VR goggle portion 5 includes the game device mounting portion 201, the marker arrangement portion 202, the holding portion 204, and a lens part unit 207. The lens part unit 207 includes a contact portion 203, the left-eye lens 205, and the right-eye lens 206. The contact portion 203 is a portion to come into contact with a part of the user's face when the user views the display of the game device body 3 mounted to the VR goggle portion 5. The lens part unit 207, the game device mounting portion 201, and the marker arrangement portion 202 are provided at positions above the holding portion 204.

The marker arrangement portion 202 is a substantially plate-like member. The marker arrangement portion 202 is provided at such a position that one surface (surface facing in the positive direction of z axis in FIG. 9) thereof is opposed to the holding operating portion 6. The game device mounting portion 201 is for mounting the game device body 3. The game device mounting portion 201 is provided at such a position as to be sandwiched between the marker arrangement portion 202 and the lens part unit 207. That is, the lens part unit 207, the game device mounting portion 201, and the marker arrangement portion 202 are arranged in this order along the line-of-sight direction of the user who is viewing the display 12 of the game device body 3 mounted to the VR goggle portion 5. It can also be said that the marker arrangement portion 202 is located at a position on a side (back side) opposite to the display surface of the game device body 3 mounted to the VR goggle portion 5. Although described later in detail, five markers 211 are provided on the marker arrangement portion 202 (surface thereof on the holding operating portion 6 side). In other words, the markers 211 are provided at the outer surface part of the VR goggle portion 5 that is a surface substantially parallel to the display surface and is located in the line-of-sight direction of the user who is viewing the display.

The holding operating portion 6 has the controller mounting portion 231 for mounting the controller 4, and the holding portions 232a, 232b. The user is to hold the holding operating portion 6 by grasping the holding portions 232a and 232b together by the right hand, for example. It is noted that the details of mounting of the controller 4 to the holding operating portion 6 will be described later.

Figure 12:
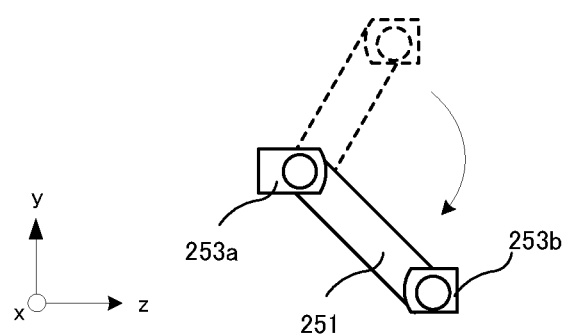
FIG. 12 is a schematic view showing a non-limiting example of the movable range of a first arm.
Figure 13:
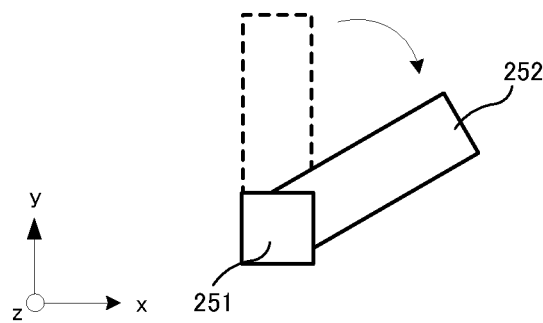
FIG. 13 is a schematic view showing a non-limiting example of orientation changes in the first arm and a second arm.

The connection arm portion 7 connects the VR goggle portion 5 and the holding operating portion 6. In the example shown in FIGS. 8 to 10, the connection arm portion 7 has a first arm 251, a second arm 252, and four joint portions 253a to 253d as movable joint portions. The joint portion 253a is provided at one end of the first arm 251, specifically, at the end that is closer to the stereoscopic image providing unit. The joint portion 253b is provided at the other end of the first arm 251. The joint portion 253c is provided at one end of the second arm 252, specifically, at the end (i.e., part connected to the first arm 251) that is closer to the stereoscopic image providing unit. The joint portion 253d is provided at the other end (i.e., end closer to the movable image capturing unit) of the second arm 252. It can also be said that the joint portion 253a is provided at an end, of the connection arm portion 7, that is closer to the stereoscopic image providing unit. It can also be said that the joint portions 253b and 253c are provided between one end and the other end of the connection arm portion 7. It can also be said that the joint portion 253d is provided at an end, of the connection arm portion 7, that is closer to the movable image capturing unit. The first arm 251 and the second arm 252 are configured such that the orientations thereof can be changed around the x axis in FIG. 2 with the respective joint portions as fulcrums (see, for example, FIG. 12). That is, they are rotatable around the x axis. The joint portions 253b and 253c are connected such that the orientations of the first arm 251 and the second arm 252 can be changed around the z axis in FIG. 2 (see, for example, FIG. 13). That is, they are rotatable around the z axis. The structure for enabling rotation may be any type. For example, the rotation is enabled by connecting the surfaces of the joint portion 253b and the joint portion 253c that face each other, using a disk-like joint. Alternatively, a structure using a so-called universal joint may be employed. As described above, the joint portion 253 can be said to have a function as a movable portion of the connection arm portion 7.

It is noted that also the joint portions 253a and 253d may be configured to be rotatable around the z axis. For example, the same structure as for the joint portion 253b and the joint portion 253c may be employed also for the joint portions 253a and 253d.

Figure 14:
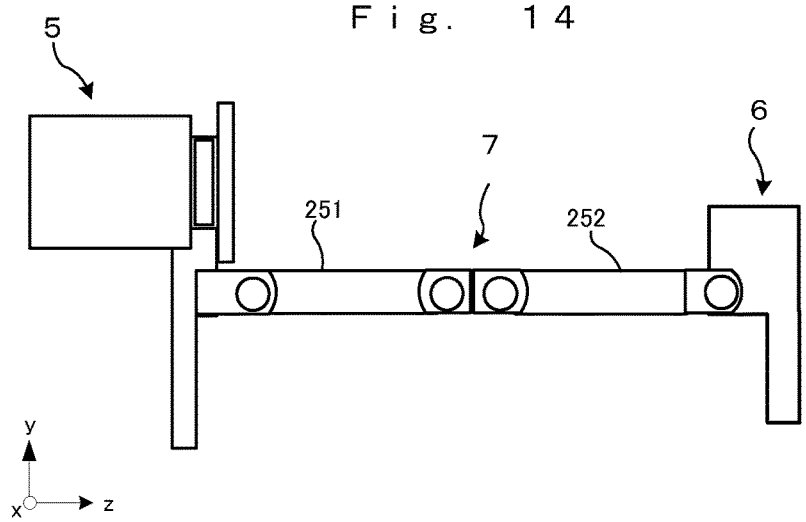
FIG. 14 illustrates a non-limiting example of change in the positional relationship between a VR goggle portion 5 and a holding operating portion 6.
Figure 15:
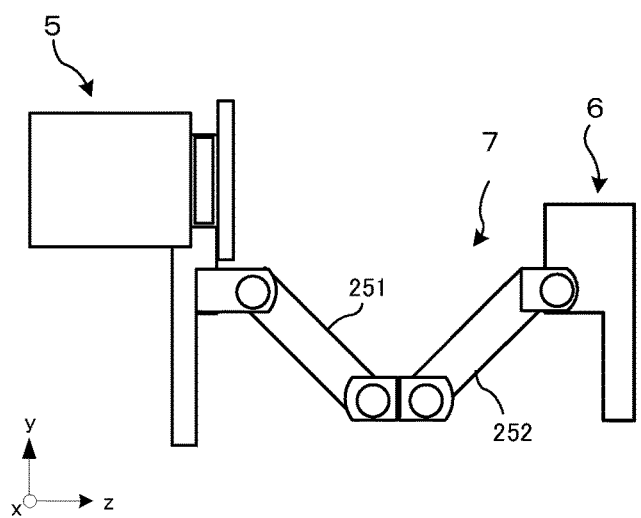
FIG. 15 illustrates a non-limiting example of change in the positional relationship between the VR goggle portion 5 and the holding operating portion 6.
Figure 16:
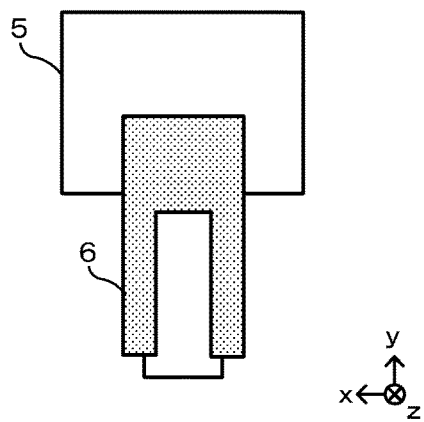
FIG. 16 illustrates a non-limiting example of change in the positional relationship between the VR goggle portion 5 and the holding operating portion 6.
Figure 17:
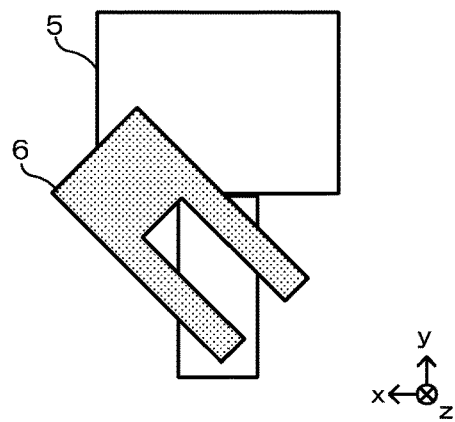
FIG. 17 illustrates a non-limiting example of change in the positional relationship between the VR goggle portion 5 and the holding operating portion 6.

The above structure in which the connection arm portion 7 has the joint portions 253 makes it possible to change the positional relationship and/or the orientation relationship between the VR goggle portion 5 and the holding operating portion 6 (and thus, between the stereoscopic image providing unit and the movable image capturing unit). FIG. 14 and FIG. 15 show examples of change in the positional relationship. FIG. 14 is a schematic view in the case where the VR game kit 2 is seen from the right side. In FIG. 14, the connection arm portion 7 is fully extended in the horizontal direction in the drawing. On the other hand, FIG. 15 shows a state in which the connection arm portion 7 is substantially in a V shape. Therefore, the distance between the VR goggle portion 5 and the holding operating portion 6 along the z axis in FIG. 15 is shorter than that in FIG. 14. That is, in FIG. 15, the position of the holding operating portion 6 has changed to a position closer to the VR goggle portion 5 than in the case of FIG. 14. That is, the positional relationship between the VR goggle portion 5 and the holding operating portion 6 is changed. FIG. 16 and FIG. 17 show examples of change in the orientation relationship. FIG. 16 is a schematic view in the case where the VR game kit 2 in a state as shown in FIG. 14 is seen from the holding operating portion 6 side (along the z axis). In FIG. 16 and FIG. 17, for facilitating recognition of a part corresponding to the holding operating portion 6, the part is shown by a dot pattern, and for facilitating understanding of the relationship between the VR goggle portion 5 and the holding operating portion 6, the connection arm portion 7 is not shown. FIG. 17 shows a state in which the orientation of the holding operating portion 6 has been changed by being rotated around the z axis from the state shown in FIG. 16 (strictly speaking, in the configuration in this example, also the second arm 252 is to be rotated together). That is, it can be said that the orientation relationship between the VR goggle portion 5 and the holding operating portion 6 is changed between FIG. 16 and FIG. 17.

Regarding the connection position between the connection arm portion 7 and the VR goggle portion 5, in the exemplary embodiment, the connection arm portion 7 is connected at a position that is substantially at the center in the x-axis direction in FIG. 9 and FIG. 10 and under the lens part unit 207. In other words, the connection arm portion 7 is connected at a position that is near substantially the center of the lower side of the marker arrangement portion 202 and that includes a line vertically extending through substantially the center of the marker arrangement portion 202. Regarding the connection position between the holding operating portion 6 and the connection arm portion 7, in the exemplary embodiment, the holding operating portion 6 is connected at a position that is near its end on the VR goggle portion 5 side and near the lower end part of the controller mounting portion 231.

The connection positions of the joint portions and the movable ranges of the first arm 251 and the second arm 252 (further, holding operating portion 6) described above are merely examples, and these are not limited to the above configurations. The number of the joint portions may be increased so as to expand the movable ranges of the first arm 251 and the second arm 252, and the like, or conversely, the number of the joint portions may be decreased so as to reduce the movable ranges of the first arm 251 and the second arm 252, and the like. Alternatively, for example, a configuration using only the first arm 251 may be employed, or the number of arms may be three or more.

Figure 18:
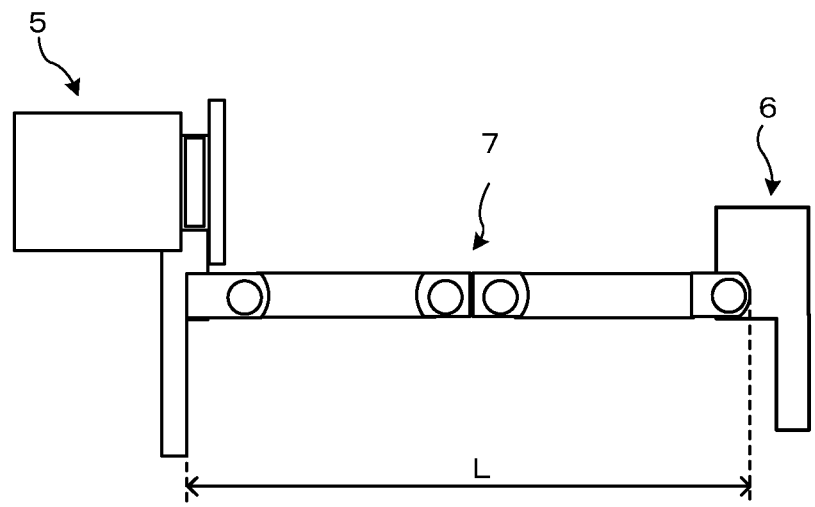
FIG. 18 is a schematic view showing a non-limiting example of a state in which the length of a connection arm portion is maximized.

In the exemplary embodiment, the first arm 251 and the second arm 252 have the same length. As shown in FIG. 18, a length L when the connection arm portion 7 is maximally elongated is set to be almost equal to the average arm length of adult males or slightly shorter than this, for example.

Figure 19:
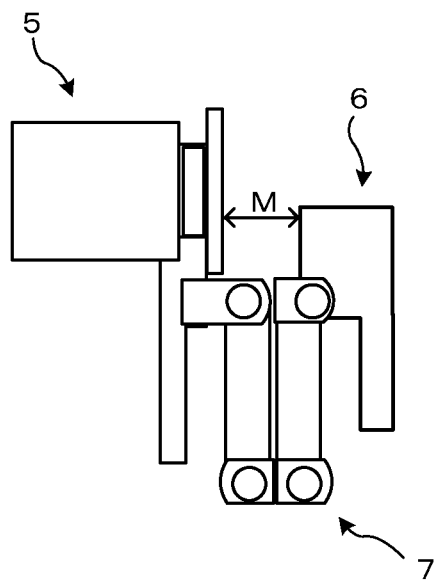
FIG. 19 is a schematic view showing a non-limiting example of a state in which the length of the connection arm portion is minimized.

Here, FIG. 19 shows an example in which the connection arm portion 7 is folded to have the minimum length (folded up). As shown in FIG. 19, even in the minimum length state, a certain distance M is ensured between the marker arrangement portion 202 and the holding operating portion 6 (lower surface of controller 4). In other words, the connection arm portion 7 is configured so as to ensure such a distance that infrared light is emitted from the controller 4 to the marker arrangement portion 202 and the reflected light can be captured by the infrared image capturing section 123, even in the minimum length state.

In the exemplary embodiment, the VR game kit 2 as described above is provided as an assembly kit made of a cardboard material, to a user. The user is to assemble the VR game kit 2 by him/herself. In another exemplary embodiment, an assembly kit for causing the user to assemble the kit may not necessarily be employed. For example, a finished product obtained by forming the VR goggle portion 5, the connection arm portion 7, and the holding operating portion 6 integrally with a plastic material or the like, may be provided. As a matter of course, while plastic molding is used, they may be molded separately instead of integral molding. That is, the following configuration may be employed: the VR goggle portion 5, the connection arm portion 7, and the holding operating portion 6 are molded by a plastic and they are connectable via the connection arm portion 7 (as it were, an assembly kit made of a plastic material may be employed).

Figure 20:
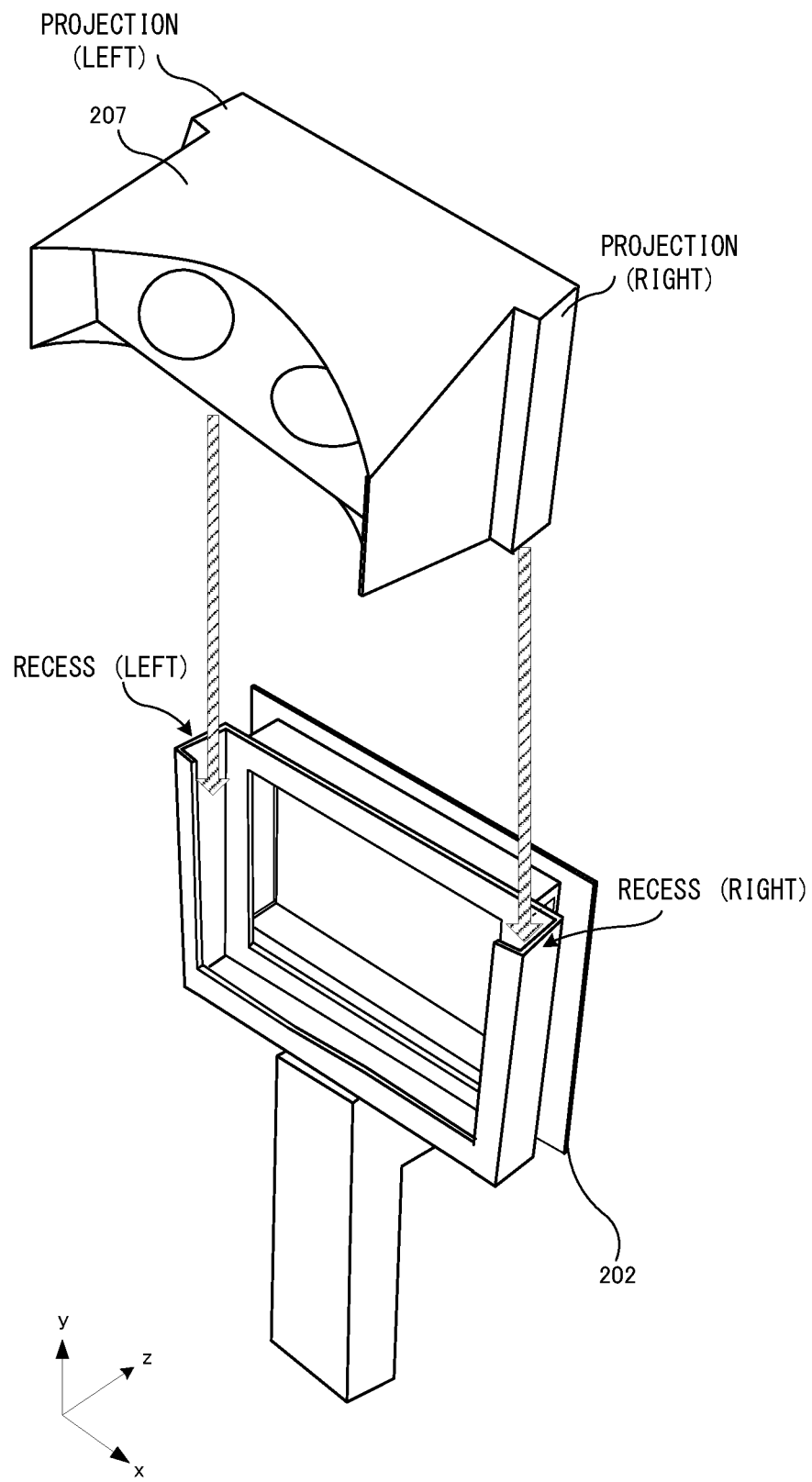
FIG. 20 is a schematic view showing a non-limiting example of the VR goggle portion.

Next, the details of the VR goggle portion 5 will be described. In the exemplary embodiment, the lens part unit 207 is configured to be attachable and detachable. For reference, FIG. 20 shows a schematic view of an example in which the lens part unit 207 is separated. In FIG. 20, the lens part unit 207 can be mounted such that right and left projections of the lens part unit 207 are inserted from above into recesses of the VR goggle portion 5.

Figure 21:
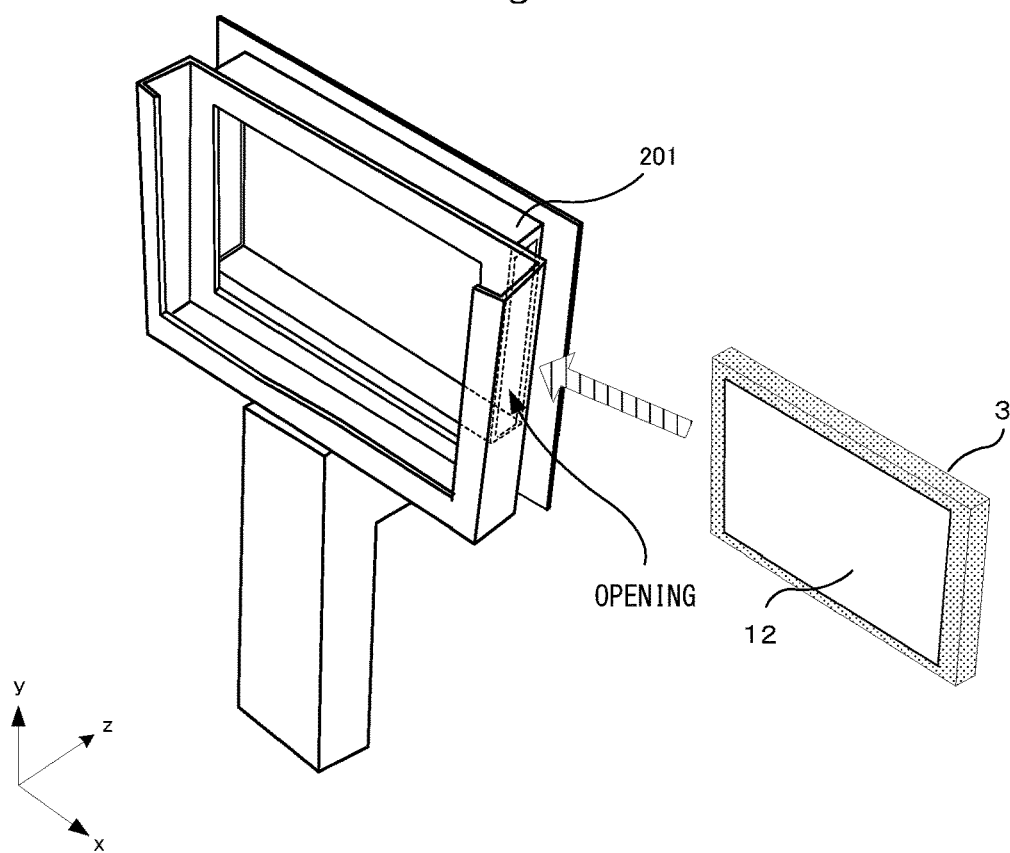
FIG. 21 shows a non-limiting example in which the game device body 3 is mounted to the VR goggle portion.
Figure 22:
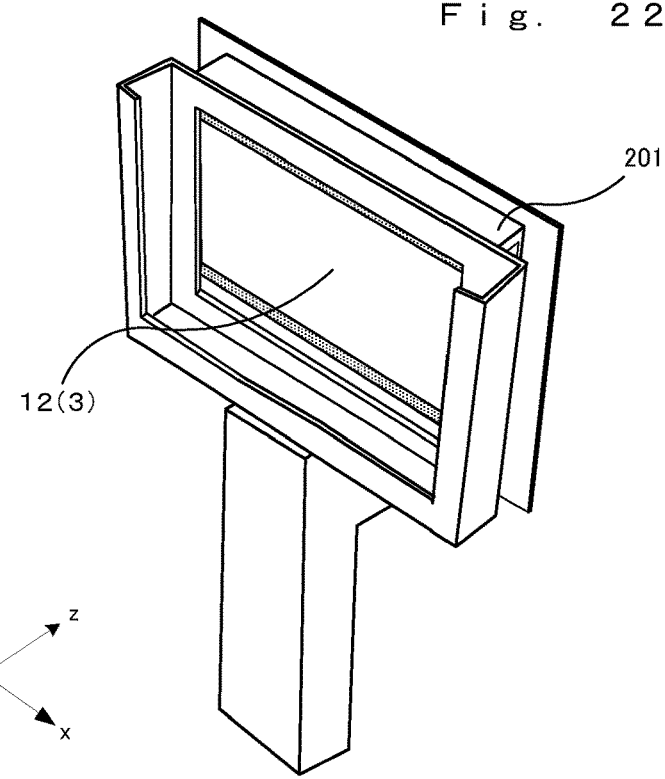
FIG. 22 shows a non-limiting example in which the game device body 3 is mounted to the VR goggle portion.

It is noted that the game device body 3 is mounted as shown in FIG. 22 by being inserted through an opening provided on the right side (or left side) of the game device mounting portion 201 as shown in FIG. 21.

In another exemplary embodiment, the lens part unit may not be configured to be attachable and detachable as described above. In the exemplary embodiment, the lens part unit is configured to be attachable and detachable as described above because the assembly kit made of a cardboard material is assumed. However, without providing such an attachment/detachment mechanism, for example, a structure integrally molded with a plastic or the like may be employed.

Figure 23:
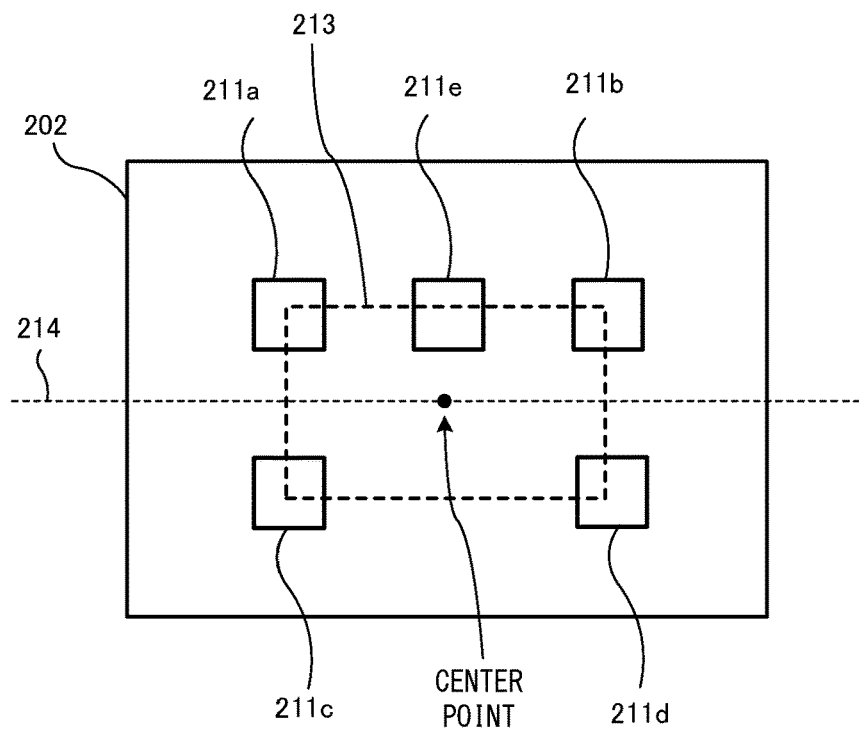
FIG. 23 is a schematic view showing a non-limiting example of a marker arrangement portion 202 as seen from the front side.

Next, the markers on the marker arrangement portion 202 will be described. FIG. 23 shows a schematic view of the marker arrangement portion 202 as seen from the front side in the case where a surface on which the markers 211 are arranged is defined as the front side. That is, FIG. 23 is a view as seen from the front side in the case where the surface of the VR goggle portion 5 that faces toward the holding operating portion 6 side is defined as the front side, in the state shown in FIG. 2. In the exemplary embodiment, five markers 211, i.e., the markers 211a, 211b, 211c, 211d, 211e are provided on the marker arrangement portion 202. In other words, it can be said that the markers 211 are arranged on the surface that faces substantially in the same direction as the user's line-of-sight direction in a state in which the user views the display 12 mounted to the VR goggle portion 5. As shown in FIG. 23, the marker arrangement portion 202 has a rectangular shape. Each marker 211 has a square shape. In the exemplary embodiment, the markers 211a to 211e are made of a retroreflective material. The markers 211 are pasted to the marker arrangement portion 202.

Of the above five markers, four markers (markers 211a to 211d) are located at four corners of an imagined rectangular shape (dotted line part 213 in FIG. 23) that is smaller than the marker arrangement portion 202. The remaining one (marker 211e) is located substantially at the center of the upper side of the imagined rectangular shape. Here, in FIG. 23, the five markers 211 are arranged to be asymmetric between the upper side and the lower side with respect to a dotted line 214 in FIG. 23. The dotted line 214 passes through the center point among the four markers and extends in the right-left direction. Here, the center point refers to such a position where the lengths of four lines extending from the position of the center point as a start point to the four markers 211a to 211d as end points (distances from the start point to the end points) are substantially the same length (i.e., equal-distance position). It can also be said that the five markers are arranged to be asymmetric between the upper side and the lower side with respect to a second line (dotted line 214) that substantially extends in the right-left direction and passes through the center point. In other words, in the exemplary embodiment, the five markers 211 are arranged so as not to be aligned on the same line. The reason why the markers 211 are arranged to be asymmetric between the upper side and the lower side is to facilitate recognition of one predetermined direction. Specifically, in the exemplary embodiment, the marker 211e serves to indicate the "upward direction".

In the exemplary embodiment, infrared light is emitted from the infrared light-emitting section 124 toward the marker arrangement portion 202, and image capturing is performed by the infrared image capturing section 123 (the image capturing direction is the light emission direction of the infrared light-emitting section 124). Then, the orientation of the controller 4 is calculated on the basis of the reflected light image (marker image) in the captured image. Specifically, the inclination of the controller 4 can be calculated on the basis of marker images corresponding to the markers 211a to 211d. Here, by further determining a marker image that corresponds to the marker 211E, it becomes possible to also determine that the direction in which the marker 211e is present is the "up" direction in the real space. Even in the case of not using the marker 211e, determination as to the up-down direction can be performed by, for example, calculation of the gravity direction using the acceleration sensor 114 or the like. However, the aforementioned method using the marker 211e can determine the up-down relationship more easily than in the case of performing a separate calculation process as described above.

Figure 24:
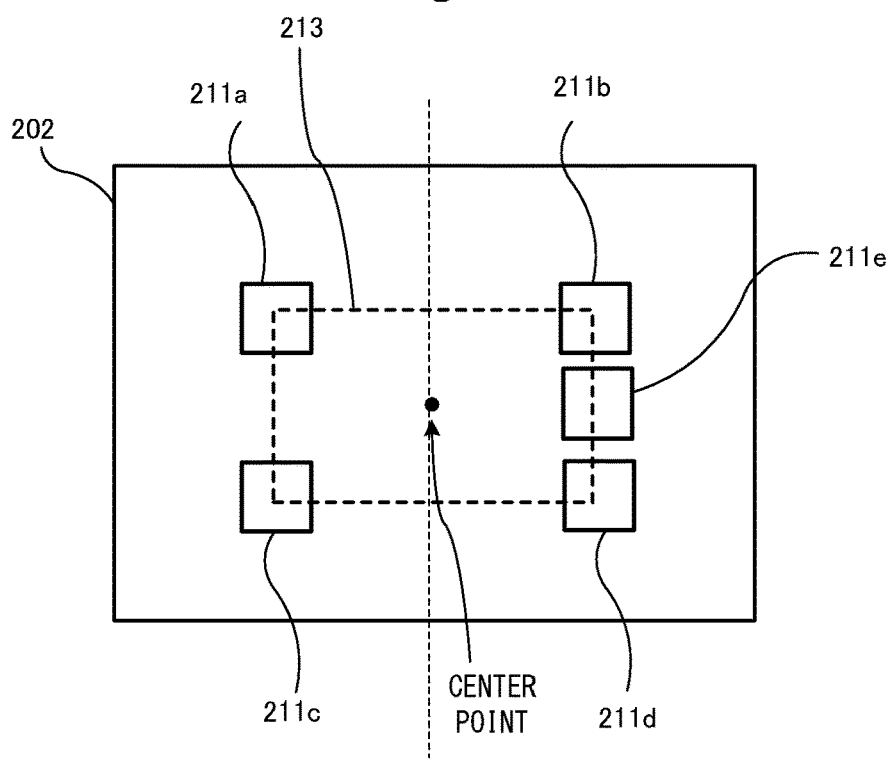
FIG. 24 is a schematic view showing another non-limiting example of a marker arrangement portion 202.

Since one predetermined direction only has to be determined, for example, as shown in FIG. 24, the marker 211e may be located substantially at the center of the right side of the imagined rectangular shape. In this case, the marker 211e serves to indicate "right". The markers 211 are arranged to be asymmetric between the right side and the left side. In other words, the arrangement is asymmetric between the right side and the left side with respect to a line passing through the center point among the markers and extending in the up-down direction. In this way, if the markers are arranged to be asymmetric between the upper side and the lower side or asymmetric between the right side and the left side as described above, it is possible to determine one predetermined direction in the real space in a simple manner, and thus reduction of processing load and high-speed processing can be achieved. In addition, owing to such a configuration, it becomes easy to perform determination as to the concept of the up-down direction or the concept of the right-left direction as seen from the holding operating portion side (movable image capturing unit side), for example.

Figure 25:
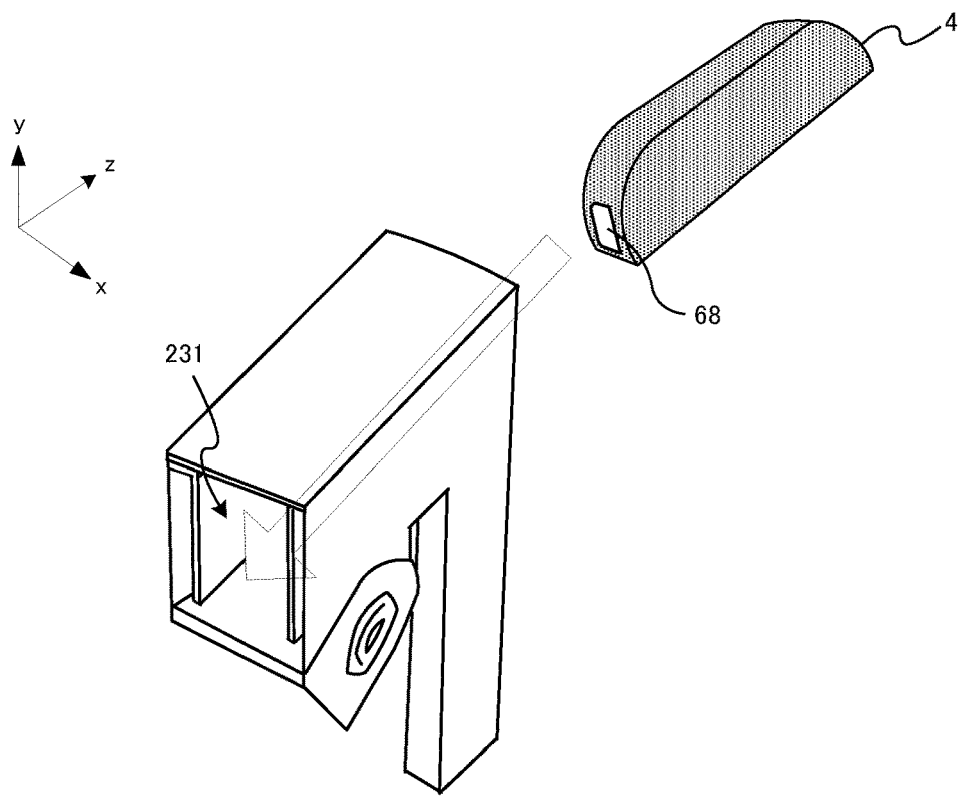
FIG. 25 illustrates a non-limiting example regarding mounting of the controller 4 to the holding operating portion 6.

Next, mounting of the controller 4 to the holding operating portion 6 will be described. As shown in FIG. 25, in the exemplary embodiment, the controller 4 is mounted to the controller mounting portion 231 of the holding operating portion 6. At this time, the controller 4 is mounted such that the lower side surface thereof having the window portion 68 faces the user side (VR goggle portion 5 side). It is noted that the position of the controller 4 after mounting is fixed at a predetermined position.

Figure 26:
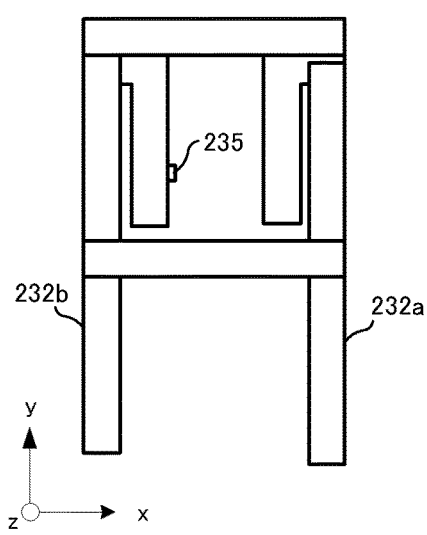
FIG. 26 illustrates a non-limiting example regarding mounting of the controller 4 to the holding operating portion 6.
Figure 27:
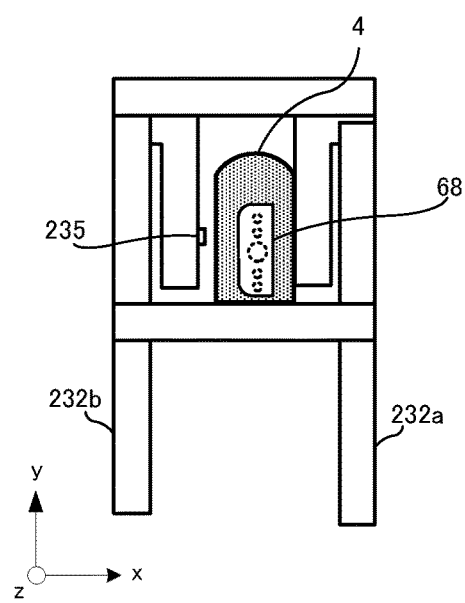
FIG. 27 illustrates a non-limiting example regarding mounting of the controller 4 to the holding operating portion 6.

FIG. 26 shows a schematic view of the holding operating portion 6 before the controller 4 is mounted thereto, as seen from the front side. FIG. 27 shows a schematic view of the holding operating portion 6 to which the controller 4 has been mounted, as seen from the front side. Here, the front side is a side surface (side surface facing the user), of the holding operating portion 6, that faces the VR goggle portion 5 side in the state shown in FIG. 2. As shown in FIG. 27, the controller 4 is fixed such that the window portion 68 thereof faces the user side, in a state after the mounting.

Figure 28:
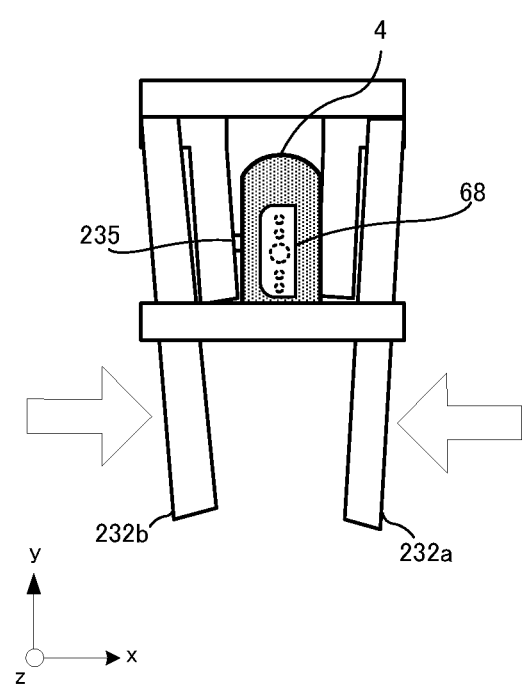
FIG. 28 illustrates a non-limiting example regarding mounting of the controller 4 to the holding operating portion 6.

Here, the controller mounting portion 231 has a protrusion 235. The position of the protrusion 235 is such a position that is to be opposed to a predetermined button, e.g., the button 56, of the controller 4 after the mounting. When the user squeezes the holding portions 232a, 232b, as shown in FIG. 28, the holding portions 232 are slightly inclined toward the inside of the holding operating portion 6, and the protrusion 235 presses the button 56. That is, the holding operating portion 6 is provided with also a pressing mechanism for pressing a predetermined button of the controller 4. Thus, the user can perform an operation of pressing the button 56, as well as an operation of moving the holding operating portion 6 itself.

As described above, in the game system of the exemplary embodiment, it is possible to capture a motion of a user in a VR game or the like and estimate the position and the orientation of the holding operating portion 6, with a compact system configuration. That is, unlike the conventional case, without taking great time and effort for arranging cameras in advance so as to allow the entire user to be captured, it is possible to capture a motion of the user and estimate the position and the orientation of the holding operating portion 6 merely by ensuring a compact space, i.e., a space near the user.

Figure 29:
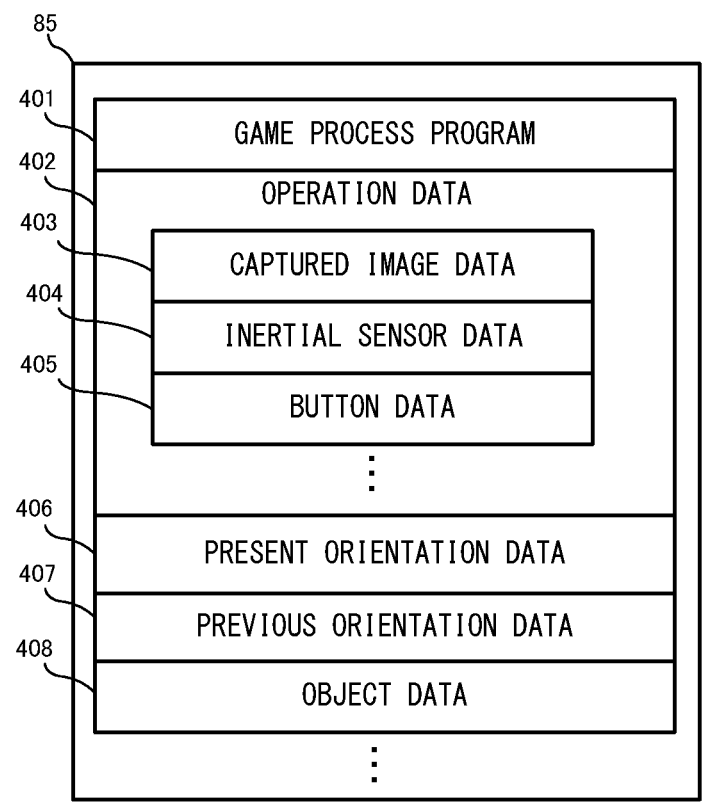
FIG. 29 shows a non-limiting example of a program and information stored in a DRAM 85 of the game device body 3.
Figure 30:
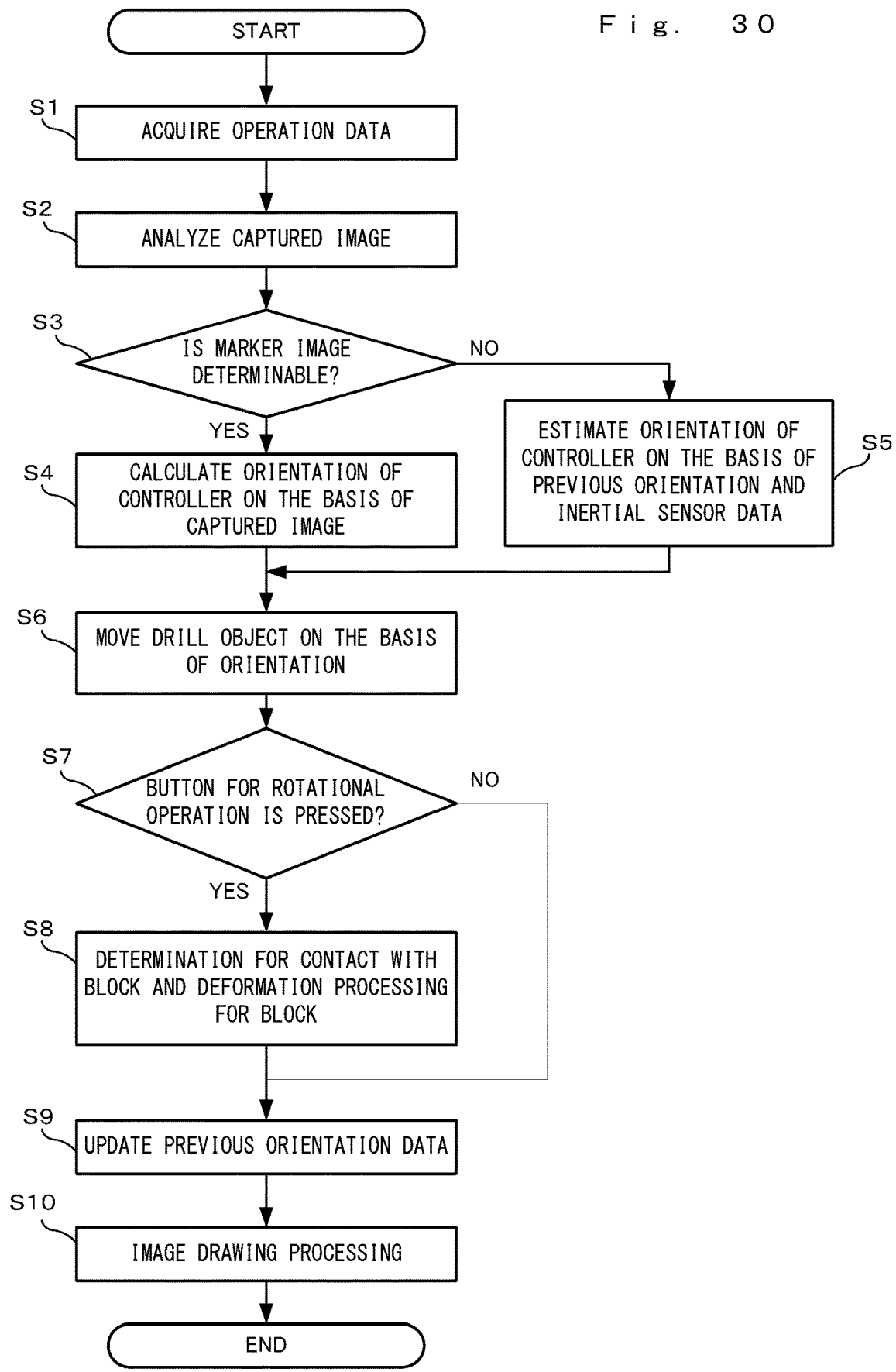
FIG. 30 is a non-limiting example of a flowchart showing the details of a game process executed by the game device body 3.

Next, a process by the game system 1 in the exemplary embodiment will be described in detail with reference to FIG. 29 and FIG. 30.

[Data to be Used]

First, various types of data used in the game system 1 will be described. FIG. 29 shows an example of a program and information stored in the DRAM 85 of the game device body 3. The DRAM 85 stores a game process program 401, operation data 402, present orientation data 406, previous orientation data 407, object data 408, and the like.

The game process program 401 is a program for executing a game process according to the exemplary embodiment. Specifically, the game process program 401 is a program for executing a flowchart process shown in FIG. 30 described later.

The operation data 402 is data indicating various types of operations performed on the controller 4. The operation data 402 includes captured image data 403, inertial sensor data 404, button data 405, and the like. The captured image data 403 is data of an image captured by the infrared image capturing section 123. The inertial sensor data 404 includes acceleration data and angular velocity data outputted from the acceleration sensor 89 and the angular velocity sensor 90. The button data 405 is data indicating the press states of the respective buttons.

The present orientation data 406 is data indicating the orientation of the controller 4 at present. The previous orientation data 407 is data indicating the orientation calculated prior to the calculation of the orientation of the controller 4 at present. That is, the previous orientation data 407 is the orientation data calculated previously (most recently).

The object data 408 is data of various objects such as the block object 501 and the drill object 502 in the virtual space.

[Details of Flowchart]

Next, with reference to the flowchart shown in FIG. 30, the flow of the game process executed by the game system 1 will be described. It is noted that execution of a process of steps S1 to S10 in FIG. 30 is repeated every frame (e.g., 1/60), for example.

First, in step S1, the processor 81 acquires the operation data 402. Next, in step S2, the processor 81 performs analysis processing for the captured image data 403 included in the operation data 402. That is, processing is executed in which the captured image is analyzed to determine and specify images (hereinafter, simply referred to as marker images) corresponding to the markers which are detection targets in the captured image. Further, processing of calculating the position, the shape, the size, the brightness, and the like of each specified marker image in the captured image, is executed. Examples of the case where no marker image can be determined include a case where there are many noise light images in the captured image and therefore it is impossible to determine which is a marker image. Also the case where the markers 211 (all of the five markers) are not included within the image capturing range upon capturing is considered to be a case where it is impossible to determine the marker images. In the case where some of the five markers 211 are captured, it may be considered that the marker images cannot be determined, or processing of estimating the marker 211 that is not captured, by performing predetermined interpolation processing, may be performed.

Next, in step S3, the processor 81 determines whether or not the marker images can be determined, as a result of the analysis processing. That is, whether or not a valid marker image has been obtained is determined. As a result of the determination, if the marker image can be determined (YES in step S3), in step S4, the processor 81 calculates the orientation of the controller 4 on the basis of the captured image data 403 (the marker images obtained by the analysis processing). For example, the orientation of the controller 4 is calculated on the basis of the positional relationship of the marker images in the captured image. In addition, a relative distance between the markers 211 and the controller 4 (in other words, the position of the controller 4 relative to the markers) is calculated on the basis of the sizes of the marker images. Then, data indicating the calculated orientation and distance is stored as the present orientation data 406 into the DRAM 85.

On the other hand, if no marker images can be determined (NO in step S3), in step S5, the processor 81 executes processing of estimating the present orientation of the controller 4 on the basis of the previous orientation data 407 and the inertial sensor data 404. That is, in the case where a valid marker image is not obtained, processing is executed in which the motion of the controller 4 indicated by the inertial sensor data 404 is added to the previously calculated orientation, thereby estimating the orientation and the position at present. Then, the estimated orientation and position are stored as the present orientation data 406. In this way, by using also the inertial sensor data 404 in combination, it becomes possible to estimate the orientation and the position of the controller 4 even in the case where some markers 211 are temporarily not included within the image capturing range, for example.

Here, in the exemplary embodiment, an operation is performed using the VR game kit 2 as described above. As shown in FIG. 2, a user plays with the VR goggle portion 5 held by one hand and with the holding operating portion 6 held with the other hand. Therefore, the movable range of the controller 4 is limited to a certain extent. That is, the relative positional relationship between the markers 211 and the controller 4 is limited to a certain extent. Thus, the assumed range of orientations that the controller 4 can have is limited to a certain extent. Therefore, the accuracies of calculation and estimation of the motion (present orientation) of the user as described above can be enhanced as compared to a VR system in which a user's motion is determined by capturing a wide area such as an entire room, for example.

Next, in step S6, the processor 81 moves the drill object 502 in the virtual space on the basis of the present orientation data 406.

Next, in step S7, the processor 81 determines whether or not a button set in advance as a button for rotating the drill is pressed, on the basis of the button data 405. As a result of the determination, if the button for rotating the drill is pressed (YES in step S7), in step S8, the processor 81 determines whether or not the drill object 502 (end part thereof) and the block object 501 are in contact with each other. As a result, if they are in contact with each other, processing of deforming the block object 501 as appropriate on the basis of the contact position is executed. On the other hand, if they are not in contact with each other, the block object 501 is not deformed.

On the other hand, in step S7, if it is determined that the button for rotating the drill is not pressed (NO in step S7), the above processing in step S8 is not performed.

Next, in step S9, the processor 81 updates the previous orientation data 407. That is, processing of storing the contents of the present orientation data 406 as the previous orientation data 407 is performed.

Next, in step S10, processing is executed in which the virtual space in which the above processing has been reflected is captured by the virtual camera and a game screen is generated and displayed. In the exemplary embodiment, the game screen is a stereoscopic screen. Therefore, here, a right-eye image and a left-eye image having parallax therebetween are generated and they are displayed on the display 12 so as to be arranged side by side.

As described above, in the exemplary embodiment, a game system is provided in which a user holds the VR goggle portion 5 having the markers by one hand, holds the holding operating portion 6 capable of capturing the markers by the other hand, and moves the holding operating portion 6 while capturing the markers. The game process is executed on the basis of the orientation of the holding operating portion 6 and operations thereon. Therefore, it is possible to allow the user to enjoy a VR game or the like in which the user's motion is reflected, merely by ensuring a compact space near the user. Also regarding the system configuration, large-scale work for installing a camera for VR, or the like, is not needed, and thus the system configuration can be simplified.

In addition, since the VR goggle portion 5 and the holding operating portion 6 are connected via the connection arm portion 7, the movable range of the holding operating portion 6 is limited on the basis of the movable range of the connection arm portion 7. That is, since the orientation that the holding operating portion 6 can have is limited to a certain extent, it is possible to perform more accurate estimation for the orientation of the holding operating portion 6 (controller 4).

(Modifications)

Regarding the game device body 3 in the above exemplary embodiment, in another exemplary embodiment, an information processing device such as a smartphone or a tablet terminal that is capable of performing the game process as described above may be employed. Also, the controller 4 may be communicable with such a smartphone or the like.

In the above exemplary embodiment, the example in which the game is played while the position of the holding operating portion 6 is changed, basically without moving the VR goggle portion 5, has been shown. In another exemplary embodiment, conversely, a game process may be employed in which the game is played through an operation of moving the VR goggle portion 5 (i.e., the player's head) while the holding operating portion 6 is not moved (is fixed).

In the above exemplary embodiment, the VR goggle portion 5 is configured to allow the game device body 3 (display device) to be mounted thereto (separate-component configuration). However, in another exemplary embodiment, these may be formed integrally. For example, a part corresponding to the VR goggle portion 5 and the game device body 3 (display 12 thereof) may be configured as a head mounted display (HMD). In addition, the HMD may be configured to have a function equivalent to the game device body 3. That is, the HMD may be configured to execute the game process as described above.

Other than a configuration in which the game device body 3 or the HMD has an information processing function for executing the above game process, for example, the controller 4 may be configured to have such a processing function. Alternatively, an information processing device separate from the game device body 3, the HMD, and the controller 4 may be configured to have such a processing function. For example, a stationary game device or the like that is capable of communicating with the HMD and the controller 4 may be caused to execute the game process as described above. In this case, a game image generated by the stationary game device may be transmitted to the HMD by wire or wirelessly.

Regarding the display 12, in the above example, a right-eye image and a left-eye image are displayed so as to be arranged side by side on a single display 12, thereby providing a stereoscopic image. However, without limitation thereto, for example, two different displays composed of a right-eye display and a left-eye display may be used. That is, a configuration may be employed in which the two displays are arranged side by side at the right and left, and a right-eye image and a left-eye image are respectively displayed on the right-eye display and the left-eye display, thereby displaying a stereoscopic image.

Regarding the markers 211, in the above example, a configuration in which the markers 211 made of a retroreflective material are pasted to the marker arrangement portion 202, has been described. Without limitation to such a configuration, in another exemplary embodiment, an image drawn directly on the marker arrangement portion 202 may be used as the markers 211. In addition, the shape of the markers 211 is not limited to a square, but may be another shape. Alternatively, a predetermined design or a pattern figure may be used as the markers 211.

In another exemplary embodiment, invisible markers may be used. That is, markers may be drawn using an infrared light reflective pigment or the like so that the markers cannot be visually recognized. For example, it is assumed that a predetermined illustration is drawn on the entire surface of the marker arrangement portion 202. Then, only a part of the illustration (e.g., parts corresponding to the positions of the markers 211) may be drawn using an infrared light reflective pigment (e.g., paint containing carbon). In this case, the drawing is performed such that a difference between a part drawn using the infrared light reflective pigment and a part drawn not using the infrared light reflective pigment cannot be recognized.

In the above example, the number of the markers 211 is five. However, without limitation thereto, five or more markers may be used. Alternatively, the number of markers may be three or four. It is noted that at least three markers are needed in order to achieve the above process. For example, it is conceivable that three markers are arranged in a triangular form. In this regard, invisible markers as described above may be used in combination such that, for example, one large triangle is drawn and an infrared light reflective pigment is used for the vertices thereof. It is noted that increase in the number of markers has an advantage in enhancing recognition accuracy, and decrease in the number of markers has an advantage in terms of processing load.

Regarding the providing position of the markers 211 (marker arrangement portion 202) on the VR goggle portion 5, in the above exemplary embodiment, the markers 211 are provided on the surface (in the above example, front surface) of the VR goggle portion 5 that is opposite to the display surface of the game device body 3 mounted to the VR goggle portion 5. That is, the markers 211 are provided on the surface that is on a side far from the user and is substantially perpendicular to the line-of-sight direction of the user who is viewing the display through the lenses of the VR goggle portion 5. However, the marker providing position is not limited thereto. For example, markers 211 may be further provided also to right and left side surface parts of the VR goggle portion 5. In this case, some markers 211 can be included within the image capturing range of the infrared image capturing section 123 even when the holding operating portion 6 (controller 4) is greatly moved rightward or leftward. Thus, it is possible to expand the range in which the orientation of the controller 4 and the like can be estimated, whereby the degree of freedom in operation can be enhanced.

In the case of the HMD or the like, it is also assumed that the HMD or the like does not have a plate-like shape at the position corresponding to the marker arrangement portion 202. In the case of such a shape, markers 211 as described above may be provided at such positions on the HMD that the markers 211 can be viewed as seen from the direction opposite to the line-of-sight direction of the user who is viewing the display (in other words, as seen from the infrared image capturing section 123).

In the above example, the analysis processing for, for example, specifying a marker image from a captured image is performed on the game device body 3 side. In another exemplary embodiment, the analysis processing may be performed on the controller 4 side. That is, the following configuration may be employed: the captured image is analyzed on the controller 4 side, whether a marker image is valid or invalid is determined, the number, the size, and the brightness of the markers are calculated, and a result of the calculations is transmitted to the game device body 3.

Regarding the holding operating portion 6, in the above example, a configuration in which the controller 4 is mounted to the holding operating portion 6 (separate-component configuration) has been shown. However, in another exemplary embodiment, the structure of the holding operating portion 6 having the controller 4 mounted thereto may be formed as an integrated structure. That is, the function and the structure of the holding operating portion 6 having the controller 4 mounted thereto may be provided as an integrated part in advance. For example, a housing thereof may be formed by plastic molding, and inside the housing, a circuit and a mechanism for implementing the infrared light-emitting section 124, the infrared image capturing section 123, a communication function, and the like as described above may be mounted. In other words, they may be integrally formed as a kind of dedicated controller.

The shape of the holding operating portion 6 and the mechanism for pressing a button are not limited to the above example. For example, the mechanism for pressing a button may not be provided, or conversely, a configuration that allows operation of pressing two or more buttons may be employed. Regarding the button operation, for example, a configuration that allows a user to perform a pressing operation directly by the finger may be employed.

Regarding an operation target, besides a button pressing operation as described above, in another exemplary embodiment, a touch panel, a wheel, a slider, or the like may be used as an operation target.

Regarding the connection position of the connection arm portion 7, in the above example, the VR goggle portion 5 and the connection arm portion 7 are connected at a position that is near substantially the center of the lower side of the marker arrangement portion 202 and that includes a line vertically extending through substantially the center of the marker arrangement portion 202. In another exemplary embodiment, without limitation to such a position, for example, they may be connected at a position near substantially the center of the upper side of the marker arrangement portion 202. Alternatively, they may be connected at a position that is near the lower side on one of the right and left side surfaces of the VR goggle portion 5 and that is near the marker arrangement portion 202.

In the above example, the connection arm portion 7 is configured to be foldable via the movable joint portions so as to be extendable and contractible. In another exemplary embodiment, for example, an extendable/contractible arm configuration may be employed which has an extension/contraction mechanism that allows one arm portion to be slid and stored into the other arm portion. Besides extension/contraction using a gimmick such as the movable joint portions or the extension/contraction mechanism as described above, for example, extension/contraction may be enabled by an elastic material such as rubber. In other words, the term "extension/contraction" of the connection arm portion 7 includes the extension/contraction using the gimmick and the extension/contraction using an elastic material.

In the game system 1, the connection arm portion 7 may not be provided. That is, the VR goggle portion 5 to which the game device body 3 is mounted, and the holding operating portion 6 to which the controller 4 is mounted, may be components that are completely separated from each other. In this case, for example, the play style is such that the VR goggle portion 5 to which the game device body 3 is mounted is held by the left hand and the holding operating portion 6 to which the controller 4 is mounted is held by the right hand. In this case, the movable range of the holding operating portion 6 is substantially the same as the movable range of the right arm of the user. Thus, a wider movable range is obtained as compared to the configuration using the connection arm portion 7, and therefore there is an advantage that the degree of freedom in operation is enhanced.

The above process is applicable to not only a game process but also an information process such as a simulation process for training for operation of a tool (e.g., electric tool) operated by one hand.

What is claimed is:

1. A system configured to estimate orientation and/or position, the system comprising:
   a movable image capturing portion having an image capturing device configured to capture a surrounding area, the movable image capturing portion configured to be held by a user and being portable so that the user can move the movable image capturing portion as the user holds the movable image capturing portion;
   a stereoscopic image providing portion including at least one display portion configured to display a stereoscopic image composed of a left-eye image and a right-eye image having parallax therebetween, a contact portion configured to come into contact with a part of a face of the user who is viewing the stereoscopic image, and a detection subject portion configured to be captured by the image capturing device of the movable image capturing portion that is being held by the user;
   a connection portion having a first end and a second end, the connection portion configured to connect the first end to a part of the movable image capturing portion and the second end to a part of the stereoscopic image providing portion so that the movable image capturing portion is connected to the stereoscopic image providing portion via the connection portion, wherein the movable image capturing portion is mountable to the connection portion via the first end and, after mounting, the movable image capturing portion is fixed so that an image capturing direction, of the image capturing device, faces the stereoscopic image providing portion of the user holding the movable image capturing portion; and processing circuitry having at least one processor, the processing circuitry configured to:
   detect a detection subject portion image indicating the detection subject portion and included in an image captured by the image capturing device;
   specify a position and/or a shape, in the captured image, of the detected detection subject portion image;
   estimate an orientation and/or a position of the movable image capturing portion on the basis of the specified position and/or the shape of the detection subject portion image in the captured image; and
   generate the stereoscopic image to be displayed on the at least one display portion, on the basis of a result of the estimation.

2. The system according to claim 1, wherein
   the movable image capturing portion further includes: an operating portion,
   predetermined data is generated on the basis of operation on the operating portion by the user, and
   the stereoscopic image to be displayed on the at least one display portion is generated, on the basis of a result of the estimation and the generated predetermined data.

3. The system according to claim 1, wherein
   the movable image capturing portion further includes a light-emitting device configured to emit predetermined light at least in substantially the same direction as an image capturing direction of the image capturing device, and
   the detection subject portion is made of a retroreflective material that reflects the predetermined light from the light-emitting device.

4. The system according to claim 1, wherein
   the detection subject portion is provided on a predetermined surface of the stereoscopic image providing portion that faces in substantially the same direction as a line-of-sight direction of the user who is viewing the at least one display portion in a state in which a part of the face of the user is in contact with the contact portion, and/or at such a position on the stereoscopic image providing portion that allows the detection subject portion to be viewed as seen from a direction opposite to the line-of-sight direction.

5. The system according to claim 1, wherein
   the stereoscopic image providing portion has a plurality of the detection subject portions having predetermined areas, and
   the plurality of detection subject portions include three detection subject portions that are not arranged on an identical straight line.

6. The system according to claim 5, wherein
   of the plurality of detection subject portions, at least three or more detection subject portions are arranged so as to be asymmetric between a right side and a left side and/or asymmetric between an upper side and a lower side, when the predetermined surface of the stereoscopic image providing portion is seen from a front side, and
   with the plurality of detection subject portions defined as end points, the plurality of detection subject portions are arranged so as to be asymmetric between the right side and the left side and/or asymmetric between the upper side and the lower side, with respect to a line passing a center point which is a start position from which linear distances to the end points are substantially equal to each other.

7. The system according to claim 1, wherein
the movable image capturing portion further includes an acceleration sensor and/or an angular velocity sensor, and
when the detection subject portion image cannot be determined or specified in the image captured by the movable image capturing portion, the orientation and/or the position of the movable image capturing portion is estimated on the basis of a result of detection by the acceleration sensor and/or the angular velocity sensor.

8. The system according to claim 1, wherein
a position at which the connection portion and the stereoscopic image providing portion are connected is a position that is proximate to a lower side of the surface on which the detection subject portion is provided and that is on or proximate to a line vertically extending through a center portion of the surface on which the detection subject portion is provided as seen from a front side.

9. The system according to claim 1, wherein
the connection portion has a first movable portion provided proximate to a position at which the connection portion and the stereoscopic image providing portion are connected, and
a relative positional relationship and/or a relative orientation relationship between the stereoscopic image providing portion and the movable image capturing portion is changeable by the first movable portion.

10. The system according to claim 9, wherein
the connection portion has a second movable portion provided at a predetermined position different from a position at which the connection portion and the stereoscopic image providing portion are connected, and different from a position at which the connection portion and the movable image capturing portion are connected, and
the relative positional relationship and/or the relative orientation relationship between the stereoscopic image providing portion and the movable image capturing portion is changeable by the second movable portion.

11. The system according to claim 10, wherein
the connection portion has a third movable portion provided proximate to a position at which the connection portion and the movable image capturing portion are connected, and
the relative positional relationship and/or the relative orientation relationship between the stereoscopic image providing portion and the movable image capturing portion is changeable by the third movable portion.

12. An apparatus configured to facilitate estimating orientation and/or position, the apparatus comprising:
a movable image capturing portion having an image capturing device configured to capture a surrounding area, the movable image capturing portion configured to be held by a user and being portable so that the user can move the movable image capturing portion as the user holds the movable image capturing portion;
a stereoscopic image providing portion including at least one display portion configured to display a stereoscopic image composed of a left-eye image and a right-eye image having parallax therebetween, a contact portion configured to come into contact with a part of a face of the user who is viewing the stereoscopic image, and a detection subject portion configured to be captured by the image capturing device in a state in which the user is holding the movable image capturing portion; and
a connection portion having a first end and a second end, the connection portion configured to connect the first end to a part of the movable image capturing portion and the second end to a part of the stereoscopic image providing portion so that the movable image capturing portion is connected to the stereoscopic image providing portion via the connection portion, wherein the movable image capturing portion is mountable to the connection portion via the first end and, after mounting, the movable image capturing portion is fixed so that an image capturing direction, of the image capturing device, faces the stereoscopic image providing portion of the user holding the movable image capturing portion.

13. The system of claim 1, wherein the connection portion includes a holding operation portion at the first end, the holding operation portion having a mounting portion to which the movable image capturing portion is mountable.

14. The system of claim 1, wherein the second end of the connection portion connects to the stereoscopic image providing portion at a lower part of the stereoscopic image providing portion while the stereoscopic image providing portion is being used by the user.

15. The system of claim 1, wherein the first end of the connection portion connects to the movable image capturing portion without making electrical contact with the movable image capturing portion, and the second end of the connection portion connects to the stereoscopic image providing portion without making electrical contact with the stereoscopic image providing portion.

16. The system of claim 1, wherein the detection subject portion, of the stereoscopic image providing portion, includes a marker arrangement portion including a plurality of markers detectable by the image capturing devices as the image capturing direction of the image capturing device faces the user holding the movable image capturing portion.

17. The system according to claim 1, wherein the movable image capturing portion, the stereoscopic image providing portion, and the connection portion form a combined structure such that the user can operate the combined structure while holding the stereoscopic image providing portion and the movable image capturing portion.

18. The system according to claim 1, wherein the movable image capturing portion, the stereoscopic image providing portion, and the connection portion form a virtual reality kit operable by the user holding the virtual reality kit.

19. A method for estimating orientation and/or position using a movable image capturing portion having an image capturing device configured to capture a surrounding area, wherein the movable image capturing portion configured to be held by a user and being portable so that the user can move the movable image capturing portion as the user holds the movable image capturing portion, a stereoscopic image providing portion including: at least one display portion configured to display a stereoscopic image composed of a left-eye image and a right-eye image having parallax therebetween; a contact portion configured to come into contact with a part of a face of the user who is viewing the stereoscopic image; and a detection subject portion, and a connection portion having a first end and a second end, the connection portion configured to connect the first end to a part of the movable image capturing portion and the second end to a part of the stereoscopic image providing portion so that the movable image capturing portion is connected to the stereoscopic image providing portion via the connection portion, wherein the movable image capturing portion is mountable to the connection portion via the first end and, after mounting, the movable image capturing portion is fixed so that an image capturing direction, of the image capturing device, faces the stereoscopic image providing portion of the user holding the movable image capturing portion, the method comprising:

capturing the detection subject portion using the image capturing device;

detecting a detection subject portion image indicating the detection subject portion and included in the captured image;

specifying a position and/or a shape, in the captured image, of the detected detection subject portion image;

estimating an orientation and/or a position of the movable image capturing portion on the basis of the specified position and/or the shape of the detection subject portion image in the captured image; and generating the stereoscopic image to be displayed on the at least one display portion, on the basis of a result of the estimation.

20. The apparatus of claim 12, wherein the apparatus is configured to be operatively coupled to an information processing device having at least a processor and a memory, the information processing device is configured to:

detect a detection subject portion image indicating the detection subject portion and included in an image captured by the image capturing device;

specify a position and/or a shape, in the captured image, of the detected detection subject portion image;

estimate an orientation and/or a position of the movable image capturing portion on the basis of the specified position and/or the shape of the detection subject portion image in the captured image; and generate the stereoscopic image to be displayed on the at least one display portion, on the basis of a result of the estimation.

* * * * *